(12) United States Patent
Wolfe et al.

(10) Patent No.: US 12,332,669 B2
(45) Date of Patent: Jun. 17, 2025

(54) ASBESTOS ABATEMENT DEVICES, SYSTEMS, AND METHODS

(71) Applicant: Adaptive Manometer Systems, Inc., Denver, CO (US)

(72) Inventors: Heath Michael Wolfe, Aurora, CO (US); Billy Joe Huff, Lakewood, CO (US)

(73) Assignee: Adaptive Manometer Systems, Inc., Denver, CO (US)

( * ) Notice: Subject to any disclaimer, the term of this patent is extended or adjusted under 35 U.S.C. 154(b) by 0 days.

(21) Appl. No.: 18/858,197

(22) PCT Filed: Apr. 25, 2023

(86) PCT No.: PCT/US2023/066165
§ 371 (c)(1),
(2) Date: Oct. 18, 2024

(87) PCT Pub. No.: WO2023/212544
PCT Pub. Date: Nov. 2, 2023

(65) Prior Publication Data
US 2025/0110514 A1    Apr. 3, 2025

Related U.S. Application Data

(60) Provisional application No. 63/335,158, filed on Apr. 26, 2022.

(51) Int. Cl.
*B01D 46/00*    (2022.01)
*B08B 5/04*    (2006.01)
*G01L 13/00*    (2006.01)
*G05D 16/00*    (2006.01)

(52) U.S. Cl.
CPC ............. *G05D 16/028* (2019.01); *B08B 5/04* (2013.01); *G01L 13/00* (2013.01)

(58) Field of Classification Search
CPC ........ B01D 46/00; G05D 16/00; G01L 13/00; G01L 19/08; G01L 27/00; G01L 9/0072
(Continued)

(56) References Cited

U.S. PATENT DOCUMENTS 3,924,605 A * 12/1975 Weinman ................. F23J 11/00
110/162
4,154,251 A * 5/1979 Doyel ................. A24F 19/0042
55/467

(Continued)

FOREIGN PATENT DOCUMENTS

| CN | 111609500 A | 9/2020 |
|----|----|----|
| KR | 20190103676 A | 9/2019 |
| TW | I586896 B | 6/2017 |

OTHER PUBLICATIONS

Kari Rodriguez, ISA/US, The International Search Report and the Written Opinion of the International Searching Authority, or the Declaration, Oct. 19, 2023, 18, U.S. Patent and Trademark Office, Alexandria, VA, US.

*Primary Examiner* — Minh Chau T Pham
(74) *Attorney, Agent, or Firm* — Laura Marmulstein

(57) ABSTRACT

The disclosed technology includes an asbestos abatement device that includes a housing defining a housing cavity. The asbestos abatement device may include first and second inlet ports and a negative air machine outlet coupled to the housing, and a processor coupled to a circuit board positioned inside the housing cavity. The first inlet port may be configured to measure a first pressure of an asbestos containment environment and the second inlet port may be configured to measure a second pressure of an external environment. The processor may be configured to receive first and second pressure data from the first and second inlet ports, respectively, determine a pressure differential between the asbestos containment environment and the external (Continued)

environment based on the received first and second pressure data, determine whether the pressure differential is at or less than a threshold value, and transmit a signal to the negative air machine outlet.

20 Claims, 14 Drawing Sheets

(58) Field of Classification Search
USPC ...... 55/385.2, 385.1; 454/49, 187, 236, 238; 134/110, 111, 201
See application file for complete search history.

(56) References Cited

U.S. PATENT DOCUMENTS

| | | | | |
|---|---|---|---|---|
| 4,704,951 A | * | 11/1987 | Pruchon | F16K 17/12 55/385.2 |
| 4,732,592 A | * | 3/1988 | Spengler | F24F 3/167 55/385.2 |
| 4,784,675 A | * | 11/1988 | Leber | B01D 46/46 96/135 |
| 4,786,295 A | * | 11/1988 | Newman | B01D 46/446 55/471 |
| 4,865,634 A | * | 9/1989 | Griffis | B01D 46/0086 73/714 |
| 4,902,315 A | | 2/1990 | Spicer | |
| 5,096,474 A | * | 3/1992 | Miller, Jr. | B08B 15/026 55/385.2 |
| 10,344,994 B2 | | 7/2019 | Wiley et al. | |
| 2007/0289322 A1 | * | 12/2007 | Mathews | F24F 11/77 62/225 |
| 2009/0062664 A1 | * | 3/2009 | Chang | A61B 5/02233 600/300 |
| 2012/0318137 A1 | | 12/2012 | Ragland et al. | |
| 2015/0338314 A1 | | 11/2015 | Meyer et al. | |
| 2018/0280202 A1 | * | 10/2018 | Pratt | H01H 35/245 |
| 2022/0092569 A1 | * | 3/2022 | Okada | G07G 1/0018 |

\* cited by examiner

ASBESTOS ABATEMENT DEVICES, SYSTEMS, AND METHODS

CROSS REFERENCE TO RELATED APPLICATIONS

The present application is a U.S. national stage application of PCT Patent Application No. PCT/US23/66165 under 35 U.S.C. 371, which claims the benefit of priority to U.S. Provisional Patent Application No. 63/335,158, entitled "Asbestos Abatement Devices, Systems, and Methods," filed Apr. 26, 2022, the entirety of which is hereby incorporated by reference herein for all purposes.

TECHNICAL FIELD

The technology described herein relates generally to asbestos abatement, and more specifically to asbestos containment environment regulation.

BACKGROUND

Asbestos is a naturally occurring mineral composed of soft and flexible fibers that are resistant to heat, electricity, and corrosion. These qualities made asbestos useful for insulation materials and other consumer products. Asbestos has been used in steam engines, piping, locomotives, boilers, gaskets, cement, roofing materials, automotive brake pads, and other building materials.

Scientific studies have shown that exposure to asbestos is linked to several health problems, including inflammation of the lungs and various cancers, including mesothelioma, ovarian cancer, and laryngeal cancer. Due to the health hazards related to asbestos exposure, various guidelines and federal, state, and local public safety laws have been issued to limit asbestos exposure.

Many asbestos regulations focus on asbestos abatement. Asbestos abatement is the process of removing or mitigating the effects caused by asbestos. Abatement often requires proper handling and containment of asbestos to reduce or prevent airborne release of asbestos fibers and increased exposure to the harmful substance. Abatement procedures typically involve creating and monitoring an asbestos containment environment or area to limit the release of airborne asbestos dust during removal. Current containment monitoring processes typically require an asbestos abatement professional or contractor to manually regulate the containment area to ensure asbestos particles remain in the enclosure. Manual regulation of the containment environment is time-consuming, inefficient, and costly.

The information included in this Background section of the specification, including any references cited herein and any description or discussion thereof, is included for technical reference purposes only and is not to be regarded subject matter by which the scope of the invention as defined in the claims is to be bound.

SUMMARY

The disclosed technology includes asbestos abatement devices, systems, and methods. Embodiments of the present disclosure may include an asbestos abatement device that includes a housing defining a housing cavity, first and second inlet ports coupled to the housing, a negative air machine outlet coupled to the housing, and a processor coupled to a circuit board positioned inside the housing cavity, wherein the processor is in communication with the first and second inlet ports and the negative air machine outlet. The first inlet port may be configured to measure a first pressure of an asbestos containment environment and the second inlet port may be configured to measure a second pressure of an external environment. The processor may be configured to receive first pressure data from the first inlet port and second pressure data from the second inlet port, determine a pressure differential between the asbestos containment environment and the external environment based on the received first pressure data and second pressure data, determine whether the pressure differential is at or less than a threshold value, and transmit a signal to the negative air machine outlet.

Additionally or separately, the signal may be an ON signal that turns the negative air machine outlet on when the pressure differential is at or less than the threshold value. Additionally or separately, the signal may be an OFF signal that turns the negative air machine outlet off when the pressure differential is greater than the threshold value. Additionally or separately, the processing element may be further configured to determine an amount of deviation from the threshold value when the pressure differential is less than the threshold value, and the signal may vary a frequency of power flowing through the negative air machine outlet based on the amount of deviation.

Additionally or separately, the asbestos abatement may further include a removable printer coupled to the housing. Additionally or separately, the asbestos abatement device may further include a mounting plate coupled to the housing. The mounting plate may include a left side portion and a right side portion, the left side portion and the right side portion defining a mounting plate opening therebetween. The removable printer may include a printer body, and first and second flanges on opposing sides of the printer body. The housing may include a top wall that may include a top wall opening, and that may include first and second top wall recesses on opposing edges of the top wall opening. The first and second flanges may be positioned within the first and second top wall recesses, respectively, and the printer body may be positioned inside the top wall opening. The left side portion and the right side portion may be positioned at least partially on top of the first and second flanges, respectively, and the printer body may be positioned inside the mounting plate opening. Additionally or separately, the first and second flanges may be flush with the top wall.

Additionally or separately, the asbestos abatement device may further include a USB port coupled to the housing. Additionally or separately, the asbestos abatement device may further include a graphical user interface coupled to the housing, the graphical user interface configured to display information related to the first pressure data and the second pressure data.

Other examples or embodiments of the present disclosure may include a manometer including a manometer body including a top wall, a negative air machine outlet coupled to the manometer body and configured to turn on and off based on a determined pressure differential between an asbestos containment environment and an external environment, a printer cavity defined by a portion of the manometer body, and a mounting plate coupled to the manometer body, the mounting plate defining a mounting plate opening. The top wall may define a top wall opening and first and second top wall recesses on opposing edges of the top wall opening. The top wall opening may define a printer cavity opening, and the mounting plate opening may align with the top wall opening. First and second grooves may be formed between the mounting plate and the first and second top wall recesses.

Additionally or separately, the manometer may include a processor in communication with the negative air machine outlet. The processor may be configured to determine the pressure differential between the asbestos containment environment and the external environment based on received pressure data, and transmit a signal to the negative air machine outlet to turn on or off based on the determined pressure differential.

Additionally or separately, the manometer may include a removable printer coupled to the manometer body by the mounting plate and a plurality of fasteners coupling the mounting plate to the manometer body. Additionally or separately, the removable printer may include a printer body and first and second flanges on opposing sides of the printer body. The printer body may be positioned inside the printer cavity and the first and second flanges may be positioned within the first and second grooves. Additionally or separately, the manometer body may define a plurality of fastener receptacles that receive the plurality of fasteners, the plurality of fastener receptacles including machine threaded surfaces for receiving threading of the plurality of fasteners.

Additional examples or embodiments of the present disclosure may include an asbestos abatement system including a manometer and a negative air machine. The manometer may include a manometer body, a first inlet port and a second inlet port coupled to the manometer body, a negative air machine outlet coupled to the manometer body, and a processing element in communication with the first inlet port, the second inlet port, and the negative air machine outlet. The first inlet port may be configured to measure a first pressure of an asbestos containment environment, and the second inlet port may be configured to measure a second pressure of an external environment. The processing element may be configured to receive first pressure data from the first inlet port and second pressure data from the second inlet port, determine a pressure differential between the asbestos containment environment and the external environment based on the received first and second pressure data, determine whether the pressure differential is at or less than a threshold value, and transmit a signal to the negative air machine outlet. The negative air machine may be coupled to the negative air machine outlet, and an operation state of the negative air machine may be determined by the signal.

Additionally or separately, the signal may be an ON signal that turns the negative air machine outlet on when the pressure differential is at or less than the threshold value, and the operation state of the negative air machine is an activated state. Additionally or separately, the signal may be an OFF signal that turns the negative air machine outlet off when the pressure differential is greater than the threshold value, and the operation state of the negative air machine is a deactivated state.

Additionally or separately, the processing element may be configured to determine an amount of deviation from the threshold value when the pressure differential is less than the threshold value, the signal may vary power frequency flowing through the negative air machine outlet based on the amount of deviation, and the operation state of the negative air machine may be a certain speed of operation based on the varied power frequency.

Other examples or embodiments of the present disclosure may include a method of monitoring and maintaining negative pressure in an asbestos containment area. The method may include receiving, by a processing element of a manometer, a first pressure measurement and a second pressure measurement, the first pressure measurement corresponding to pressure in an asbestos containment environment and the second pressure measurement corresponding to pressure in an external environment; determining, by the processing element, a pressure differential based on the first pressure measurement and the second pressure measurement; determining, by the processing element, whether the pressure differential is at or less than a predetermined threshold value; and activating, by the processing element, a negative air machine in communication with the processing element to adjust the pressure differential above the predetermined threshold value. Additionally or separately, activating the negative air machine may include activating, by the processing element, a negative air machine outlet coupled to the manometer, wherein the negative air machine outlet is in communication with the processing element and coupled to the negative air machine.

Further examples or embodiments of the present disclosure may include a method of monitoring an asbestos containment area to comply with negative pressure requirements. The method may include positioning an asbestos abatement device in an area outside the asbestos containment area, wherein the asbestos abatement device includes a manometer including an integrated negative air machine outlet; plugging a negative air machine into the negative air machine outlet; and activating the asbestos abatement device to monitor a negative pressure differential between the asbestos containment area and the outside area and to activate the negative air machine when the negative pressure differential is at or less than a desired or regulated negative pressure differential value.

Additional examples or embodiments of the present disclosure may include a manometer. The manometer may include a housing including a top wall, a printer cavity defined by a portion of the housing, a removable printer positioned inside the printer cavity, and a mounting plate coupled to the housing. The top wall may define an opening to the printer cavity and may define first and second recesses on opposing sides of the opening. The removable printer may include a printer body and first and second flanges on opposing sides of the printer body. The first and second flanges may be positioned within the first and second recesses. The mounting plate may include a left side portion and a right side portion. The left side portion and the right side portion may define a mounting plate opening therebetween. The mounting plate opening may align with the opening and the left side portion and the right side portion may be positioned at least partially on top of the first and second flanges.

Additionally or separately, the housing may define a plurality of fastener receptacles including machine threaded surfaces. The mounting plate may include a plurality of apertures that align with the plurality of fastener receptacles, and the mounting plate may be coupled to the housing by a plurality of fasteners positioned within the plurality of apertures and the plurality of fastener receptacles.

Additionally or separately, the manometer may include a negative air machine outlet coupled to the housing and configured to turn on and off based on a determined pressure differential between an asbestos containment environment and an external environment.

Additionally or separately, the manometer may include a processor in communication with the negative air machine outlet. The processor may be configured to determine the pressure differential between the asbestos containment environment and the external environment based on received pressure data, and transmit a signal to the negative air machine outlet to turn on or off based on the determined pressure differential.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

Figure 1A:
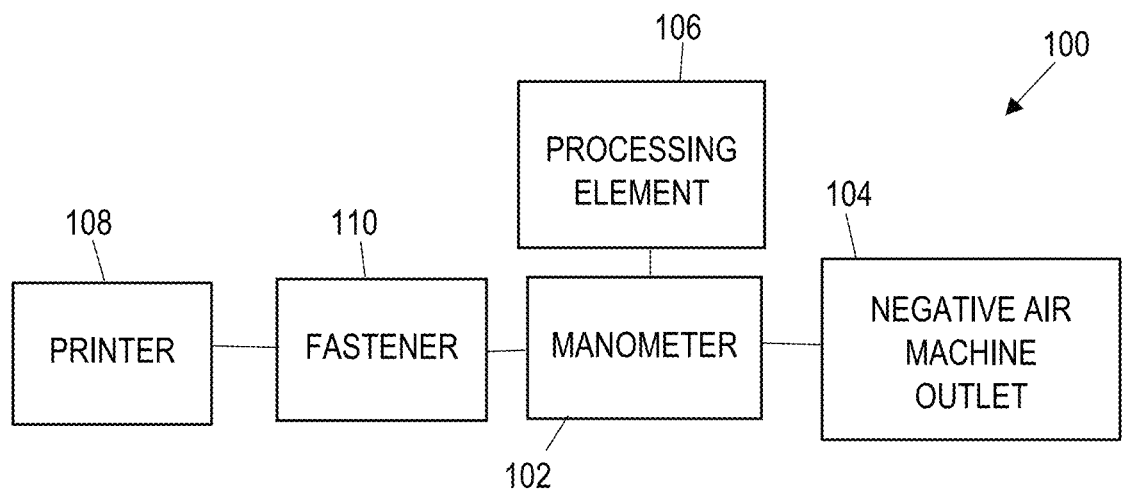
FIG. 1A is a simplified block diagram of an exemplary asbestos abatement device.

This disclosure is related to asbestos abatement devices, systems, and methods. The disclosed asbestos abatement devices, systems, and methods may monitor and regulate an asbestos containment environment (e.g., during asbestos abatement). In several embodiments, the asbestos abatement device, system, and method regulates or is configured to regulate the asbestos containment environment to restrict air flow into and filter air out of the contained environment. For example, an asbestos abatement device, system, and method may monitor and may maintain or be configured to maintain a pressure differential between the contained environment and an external or surrounding environment such that the contained environment maintains negative pressure (e.g., has a lower pressure than the external or surrounding environment). Since air flows from high pressure to low pressure, maintaining a negative pressure environment helps to contain the toxic asbestos environment by preventing air flow into the external environment. As used herein, the asbestos containment environment or area may be referred to as the containment environment or area, the contained environment or area, the containment, or the internal environment.

Asbestos abatement is the release, mitigation, and removal of asbestos from asbestos-containing materials, such as insulation and other building materials. During abatement, asbestos can be released as airborne dust that can have many negative health impacts if inhaled, including cancer (e.g., mesothelioma) and long-term lung damage (e.g., asbestosis). Accordingly, asbestos abatement is typically a highly regulated process, often requiring a licensed specialist to follow stringent procedures to ensure the asbestos abatement environment is contained, thereby avoiding contaminating the surrounding or external environment.

The process to establish an asbestos containment area typically involves sealing air ducts, disabling HVAC systems, and plasticizing walls, floors, ceilings, and any other areas. It is often required to establish and maintain negative pressure in the asbestos containment area to prevent air flow out of the containment. Authorities (e.g., local and state governments) have instituted certain regulations and/or guidelines regarding the asbestos containment area. For example, authorities may provide a preset or predetermined value for negative pressure to be maintained to prevent the release of toxins outside the containment area. As an example, the current preset or predetermined negative air pressure differential value in Colorado is at least −0.02 inches of water column (WC). Fines may result if the asbestos containment area does not comply with government regulations.

Current methods for monitoring an asbestos containment area use a digital manometer, which measures a pressure differential between two environments (e.g., the containment environment and the external environment). An exemplary manometer may include two ports for coupling to two hoses that can be positioned in two different environments (e.g., one in the containment environment and one in the surrounding external environment). The digital manometer may measure the difference in pressure between the two environments via the input received at the two ports. Some digital manometers provide alerts via an audible alarm or by sending a notification to a user device (e.g., a mobile phone) when the pressure differential drops below a certain threshold (e.g., drops below −0.02 inches of water column or another negative air pressure value determined by government regulations).

To maintain the negative pressure environment in the containment area, an asbestos abatement professional, upon receiving an alert from the digital manometer of the change in pressure differential, often must travel to the containment area and manually adjust the pressure of the containment area. For example, a HEPA-filter equipped ventilation system may be activated by the asbestos abatement professional to exhaust filtered air out of the containment area into the surrounding external environment. The ventilation system may include one or more negative air machines or fans that are manually activated to exhaust air out of the containment area. Manual regulation of the containment environment is time-consuming, inefficient, costly, and may result in fines from local government agencies for lack of compliance with local regulations.

Current regulations governing the asbestos containment area may require certain records and documentation related to the containment. As one example, negative air pressure readings may be required to be recorded at certain intervals, including the date and time of the measurements and any deviations. Some digital manometers include a printer for printing pressure readings and related information at certain intervals (e.g., at the intervals that may be required by regulation standards). These printers are typically integral parts of the manometer such that repairs often require shipping the entire manometer back to the manufacturer, making printer repairs inconvenient, time-consuming, costly, and inefficient. This inconvenience is heightened when the manometer is needed to consistently monitor an asbestos containment environment and the entire manometer needs to be sent to the manufacturer due to a printer malfunction. Because both consistent environment monitoring and frequent recording of information is often necessary to comply with asbestos abatement regulations, it is often difficult to remain in compliance when the printer is broken and needs to be repaired without the use of additional manometers.

Asbestos abatement devices, systems, and methods of the present disclosure provide more efficient and effective devices, systems, and methods for monitoring, regulating, and recording information related to an asbestos containment environment to facilitate compliance with asbestos abatement regulations. In several embodiments, disclosed asbestos abatement devices, systems, and methods automatically regulate and maintain an asbestos containment environment at a preset or predetermined negative pressure. In several embodiments, a disclosed asbestos abatement system includes a pressure differential monitoring device coupled to a pressure regulation device. The pressure differential monitoring device measures and monitors a difference in pressure between an asbestos containment environment and an external environment. When the difference in pressure or pressure differential is at or below a threshold value (e.g., a threshold negative value), the pressure differential monitoring device transmits a signal to activate the pressure regulation device. When activated, the pressure regulation device adjusts pressure in the asbestos containment environment until the pressure differential is above the threshold value. In an exemplary embodiment, the pressure differential monitoring device includes a manometer and the pressure regulation device includes a negative air machine (e.g., a fan).

In several embodiments, disclosed asbestos abatement devices, systems, and methods include a manometer having a negative air machine output or outlet configured to power and/or control a negative air machine. The manometer may measure a pressure differential between an asbestos containment environment and a surrounding environment and power and/or control the negative air machine via the negative air machine output based on the measured pressure differential. As an example, the manometer may measure pressure in inches of water column. When the inches of water column is at or below a preset or predetermined threshold value, a signal may be transmitted to the negative air machine output to control the negative air machine to adjust the inches of water column to above the preset or predetermined threshold value.

The preset or predetermined negative pressure differential threshold value may be a desired or regulated value. For example, the regulated value may be a negative pressure differential value that is dictated by government regulations on asbestos abatement and containment, which may vary (e.g., based on time or location). As an example, the current regulated negative air pressure differential value in Colorado is at least −0.02 inches of water column (WC). Other regulated negative air pressure differential values are contemplated (e.g., depending on state regulations), such as, for example, −0.03 inches of WC, −0.04 inches of WC, −0.05 inches of WC, −0.06 inches of WC, and the like. The preset or predetermined threshold value may be a negative differential value that is greater than the regulated value to allow for a buffer to prevent the negative pressure differential from reaching the regulated value and potentially dropping below the regulated value, thereby becoming noncompliant with government regulations. For example, in the example where the regulated value is −0.02 inches of WC, the preset or predetermined negative pressure differential value may be −0.021 inches of WC, −0.022 inches of WC, −0.023 inches of WC, −0.024 inches of WC, or the like to allow a buffer that prevents the pressure differential from reaching and/or dropping below the regulated value of −0.02 inches of WC.

In several embodiments, disclosed asbestos abatement devices, systems, and methods include an accessible and removable printer. The printer can be quickly accessed and removed. For example, the printer may be configured to be quickly removable such that it can be removed and replaced in a timeframe between recording intervals (e.g., as determined by regulations). By incorporating a quick-fix printer, disclosed asbestos abatement devices, systems, and methods may facilitate compliance with asbestos abatement regulations without the need for multiple devices.

Figure 1B:
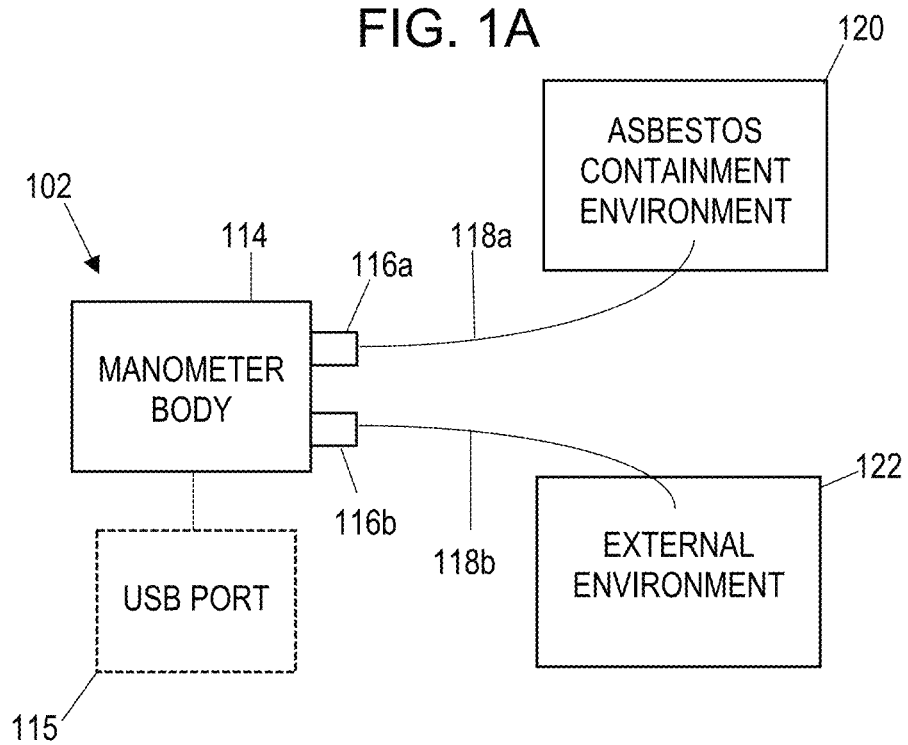
FIG. 1B is a simplified block diagram of an exemplary manometer of the asbestos abatement device of FIG. 1A.

Turning to the figures, asbestos abatement devices, systems, and methods embodiments of the present disclosure will now be discussed in more detail. FIG. 1A is a simplified block diagram of an exemplary asbestos abatement device 100. As shown, the asbestos abatement device 100 may include a manometer 102, a negative air machine outlet 104, a processing element 106, a printer 108, and a fastener 110. FIG. 1B is a simplified block diagram of the manometer 102 of the asbestos abatement device 100 of FIG. 1A. The manometer 102 may include a manometer body 114 and first and second inlet ports 116a, b coupled to the manometer body 114. As an example, the first and second inlet ports 116a, b may be metal rods extruding from the manometer body 114. The first and second inlet ports 116a, b are configured to measure pressure. The first and second inlet ports 116a, b may be coupled to an asbestos containment environment 120 and an external environment 122, respectively, via first and second connectors 118a, b. The first and second connectors 118a, b may be configured to allow air from the respective asbestos containment environment 120 and external environment 122 to pass therethrough to the respective first and second inlet port 116a, b. For example, the first and second connectors 118a, b may be tubes or hoses. The first and second inlet ports 116a, b can measure the pressure of the respective asbestos containment environment 120 and external environment 122 by the air that passes through the respective first and second connector 118a, b.

The manometer 102 may also include a universal serial bus (USB) port 115 or other data output port. The USB port 115 may be coupled to the manometer body 114. The USB port 115 or other data output port may be configured to receive a USB drive or other data storage device. For example, a USB drive may be used to receive and store data related to determined pressure differentials, as discussed in more detail below.

Returning to FIG. 1A, the asbestos abatement device 100 may include a negative air machine outlet 104 coupled to the manometer 102. For example, the negative air machine outlet 104 may be a port (e.g., an electrical outlet port) defined within the manometer body 114. As an example, the negative air machine outlet 104 may be a standard 120v AC outlet integral with the manometer body 114. As another example, the negative air machine outlet 104 may be a non-standard outlet that includes a special-purpose connector configured for variable power (e.g., to enable adjustments to power frequency and/or voltage that passes therethrough). This non-standard outlet may be useful for embodiments where power frequency and/or voltage are varied to the negative air machine to adjust its speed, as discussed in more detail below. For example, the non-standard outlet may include a dimmable receptacle. The negative air machine outlet 104 may be configured to couple to and to activate a negative air machine 112 (e.g., FIG. 9), thereby enabling the asbestos abatement device 100 (and the manometer 102) to regulate a negative pressure environment, as discussed in more detail below. While a single negative air machine outlet 104 is depicted, it is contemplated that additional negative air machine outlets may be included (e.g., two outlets to accommodate different types of fans, e.g., a regular fan and a variable frequency drive fan).

In some embodiments, the negative air machine outlet 104 is configured to turn ON and OFF based on pressure differentials detected by the manometer 102. For example, when the pressure differential detected by the manometer 102 is at or below a particular threshold value (e.g., at or less than −0.02 inches of WC), the negative air machine outlet 104 may turn ON. As another example, when the pressure differential detected by the manometer 102 is above/greater than the threshold value, the negative air machine outlet 104 may turn OFF. In some embodiments, the negative air machine outlet 104 is configured to output varying power levels (e.g., varying frequency and/or voltage) based on the pressure differential detected by the manometer 102. For example, a higher power level may be output by the negative air machine outlet 104 the greater the deviation from the threshold pressure differential value. In the example where the threshold value is −0.02 inches of WC, a higher power level may be output for −0.01 inches of WC than for −0.0125 inches of WC since −0.01 is a greater deviation from the threshold value of −0.02 than −0.0125.

The asbestos abatement device 100 may include a processing element 106 that executes certain logical operations and performs various functions. The processing element 106 may be in communication with the first and second inlet ports 116a, b and the negative air machine outlet 104. The processing element 106 may receive detected pressure data from the first and second inlet ports 116a, b and may turn the negative air machine outlet 104 ON or OFF and/or vary voltage/power frequency output by the negative air machine outlet based on the detected pressure data.

The processing element 106 may be part of a circuit that is coupled to the negative air machine outlet 104. In some embodiments, the negative air machine outlet 104 is switched on and off by the circuit. In some embodiments, the negative air machine outlet 104 receives variable power from the circuit. For example, the circuit may include a variable resistor to vary the frequency and voltage of power transmitted through the circuit to the negative air machine outlet 104. For example, the processing element 106 may adjust, via the variable resistor, the power output by the negative air machine outlet 104 based on the detected pressure differential (e.g., to increase or decrease the power/speed of the negative air machine). For example, the processing element 106 may adjust the power level or frequency output by the negative air machine outlet 104 based on the degree of deviation of the detected pressure differential from the threshold value.

In several embodiments, the asbestos abatement device 100 includes a removable printer 108. As shown in FIG. 1A, the printer 108 may be coupled to the manometer 102 by a fastener 110. The printer 108 may be coupled to the manometer body 114 such that the printer 108 is easily accessible and removable (e.g., for repair or replacement). Accordingly, the fastener 110 may be capable of connecting and disconnecting the printer 108 to the manometer body 114 (e.g., a non-permanent fastener). For example, the fastener 110 may include one or more screws, bolts, nuts, washers, anchors, snaps, Velcro, clips (e.g., a wire harness clip), and the like. For example, a plurality of screws (e.g., 2 or 4) may be used to couple the printer 108 to the manometer body 114. For example, the printer 108 and/or manometer body 114 may include a mounting plate with a plurality of apertures configured to receive the plurality of screws. The printer 108 may include ribbons that are held in place by clips coupled to the manometer body 114 (e.g., instead of conventional soldering of the ribbons). For example, the manometer body 114 may include a plurality of clips (e.g., 2 clips) to couple with the printer ribbons.

Figure 2:
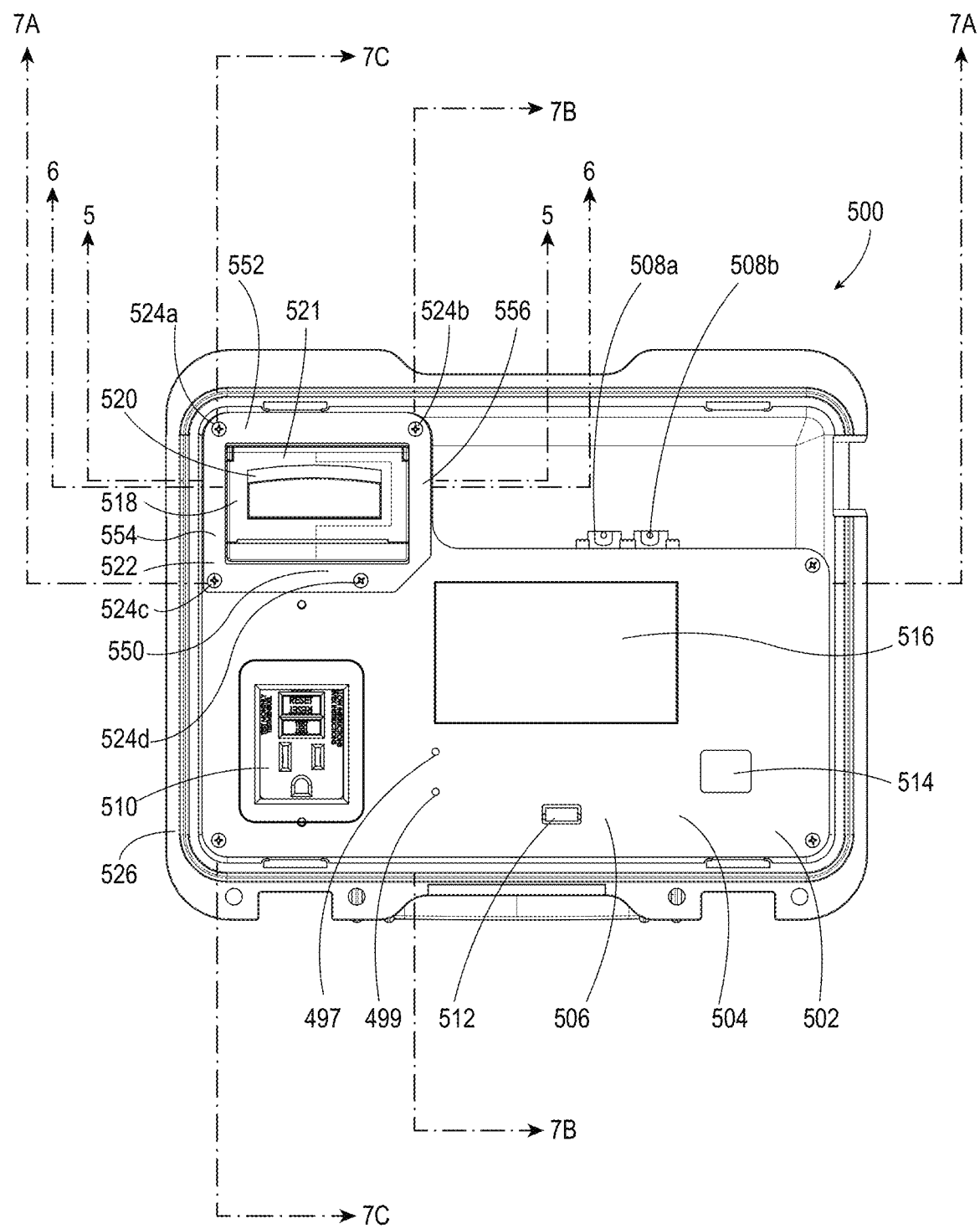
FIG. 2 is a top plan view of a first embodiment of an asbestos abatement device.
Figure 3:
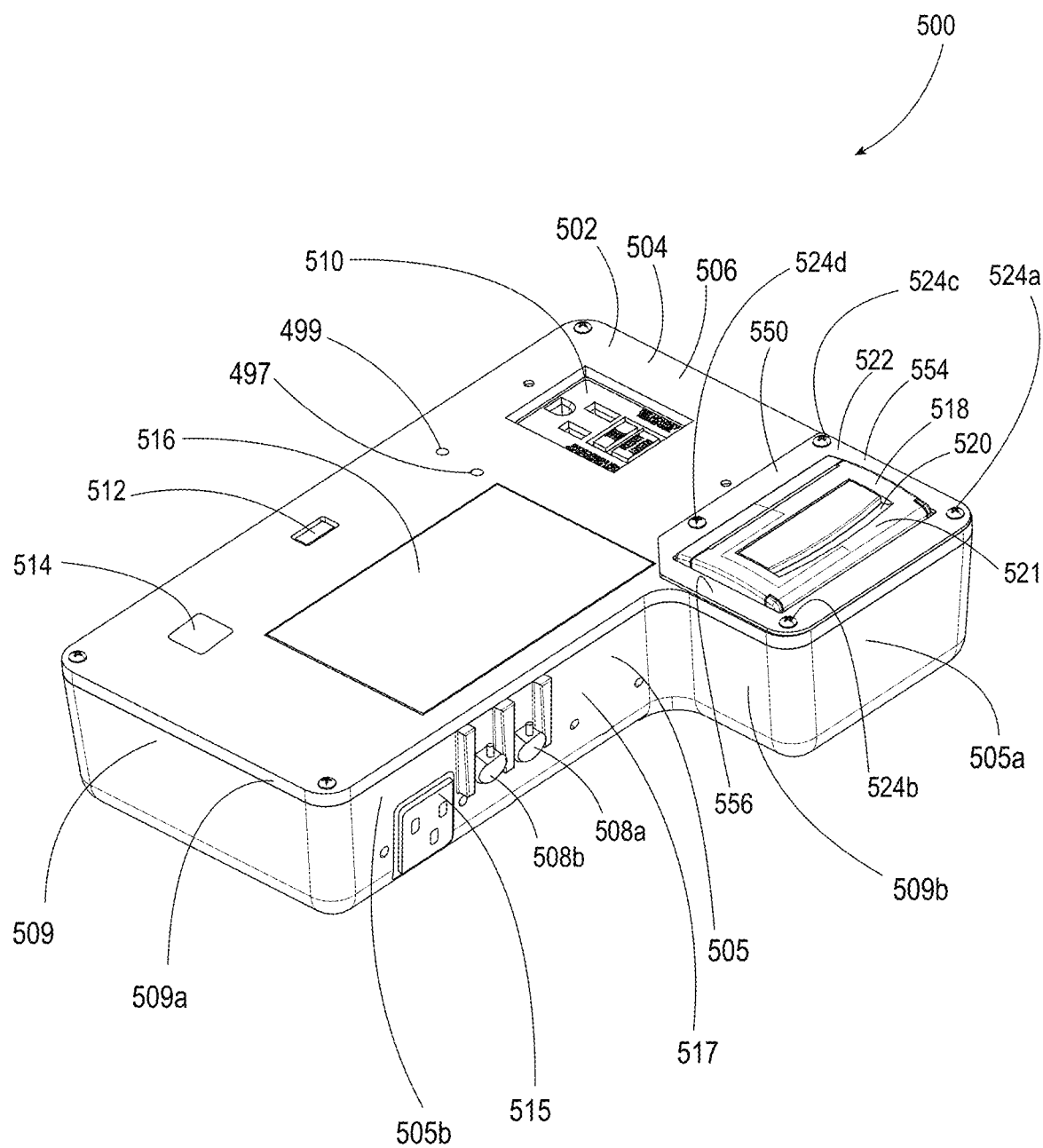
FIG. 3 is a top rear isometric view of the asbestos abatement device of FIG. 2.
Figure 4:
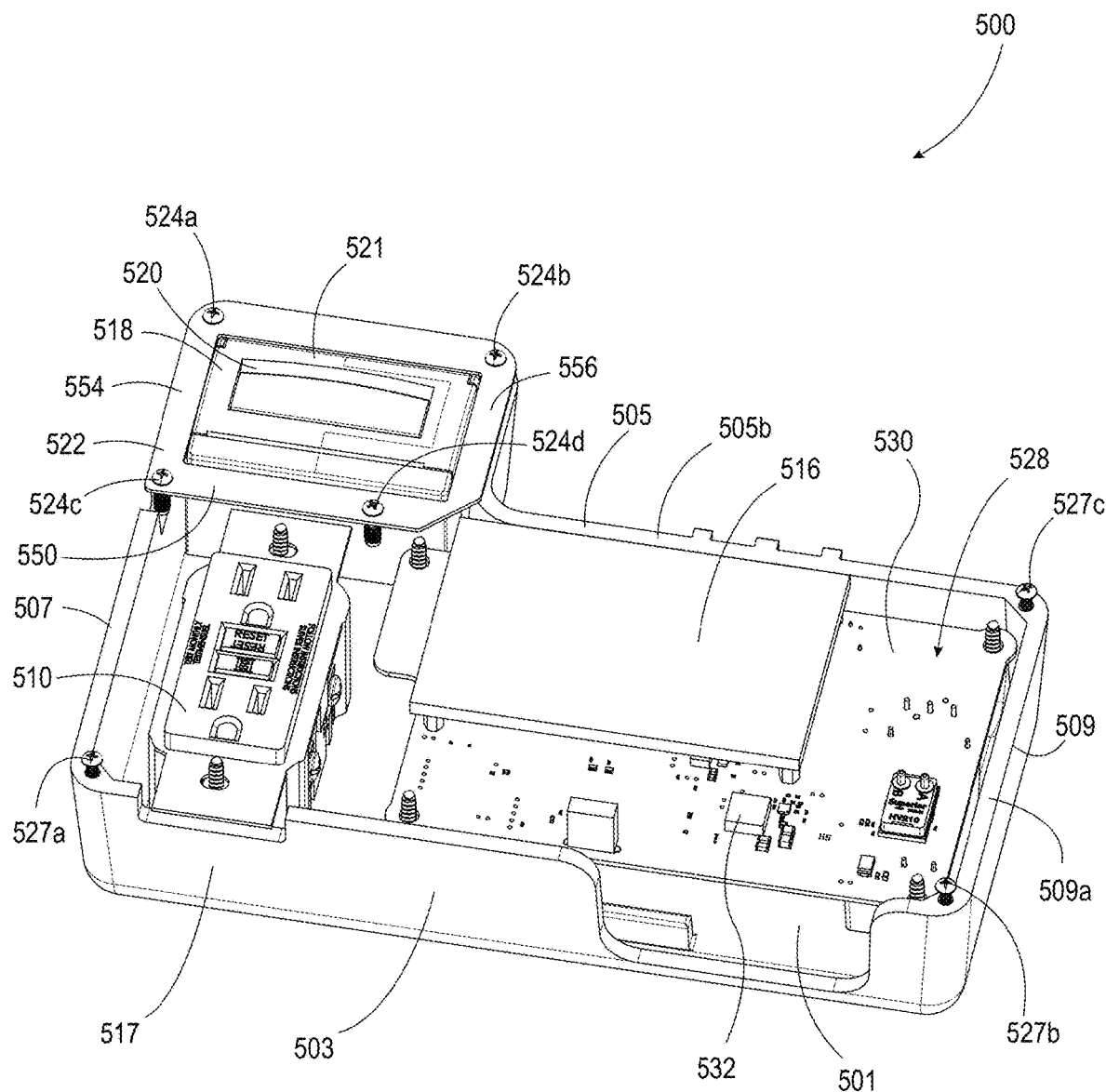
FIG. 4 is a top front isometric view of the asbestos abatement device of FIG. 2 with the top wall removed.
Figure 5:
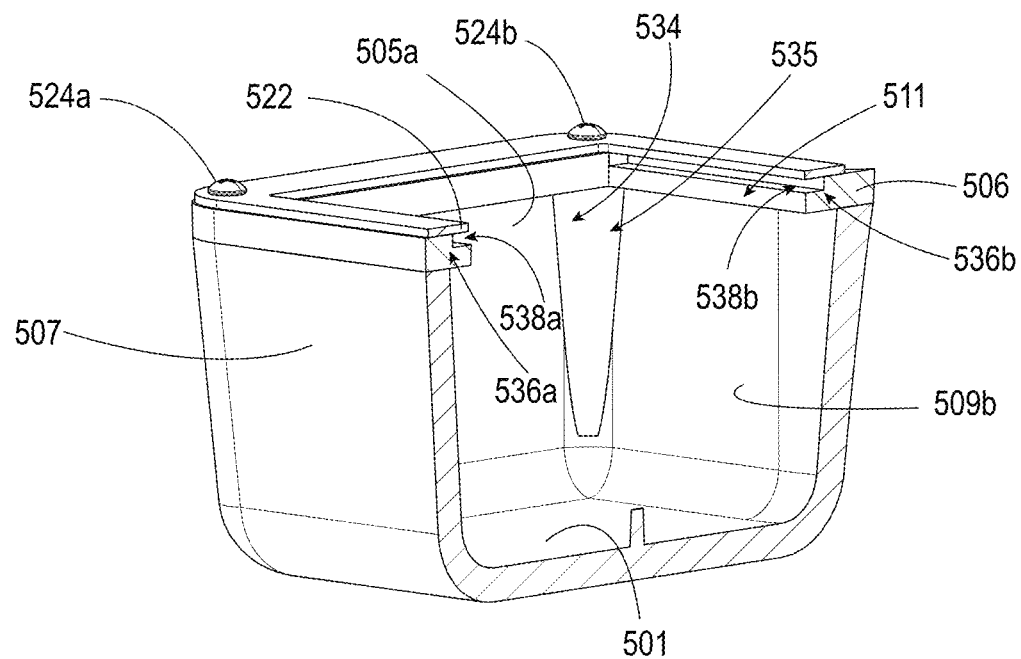
FIG. 5 is a cross section view of a printer cavity of the asbestos abatement device of FIG. 2 taken along line 5-5.

FIG. 2 is a top plan view of a first embodiment of an asbestos abatement device 500. FIG. 3 is a top rear isometric view of the asbestos abatement device 500 of FIG. 2. FIG. 4 is a top front isometric view of the asbestos abatement device 500 of FIG. 2 with the top wall removed. The asbestos abatement device 500 may include the same or similar features as those described above with respect to the asbestos abatement device 100 of FIGS. 1A-B. For example, as shown, the asbestos abatement device 500 includes a manometer 502 with a manometer body or housing 504, a negative air machine outlet 510, a graphical user interface (GUI) 516, and a printer 518. The manometer housing 504 may include a front wall 503, a rear wall 505, a left side wall 507, a right side wall 509, a top wall, plate, or membrane 506, and a bottom wall 501. The rear wall 505 may include a first rear wall portion 505a and a second rear wall portion 505b. The second rear wall portion 505b may be recessed from the first rear wall portion 505a. The right side wall 509 may include a first right side wall portion 509a and a second right side wall portion 509b. The second right side wall portion 509b may be recessed from the first right side wall portion 509a. As shown in FIG. 5, the top wall 506 may have a top wall opening 511 for receiving the printer 518. The top wall 506 may have first and second top wall recesses 536a, b on opposing edges or sides of the top wall opening 511.

It is contemplated that the manometer housing 504 may be formed by two components, a bottom plate 517 and the top plate 506. The bottom plate 517 may include the front wall 503, rear wall 505, left side wall 507, right side wall 509, and bottom wall 501. The bottom plate 517 and top plate 506 may be formed by injection molding. The bottom plate 517 and top plate 506 may be injection molded plastic. The bottom plate 517 and top plate 506 may be coupled to form the manometer housing 504. As shown, the top plate 506 may be coupled to the bottom plate 517 by a plurality of fasteners 527a, b, c. While three fasteners 527a, b, c, more or less are contemplated.

As shown in FIG. 4, the manometer housing 504 may define a housing cavity 528. The housing cavity 528 may be formed by the front wall 503, rear wall 505, left side wall 507, right side wall 509, top wall 506, and bottom wall 501. A printed circuit board (PCB) 530 may be positioned inside the housing cavity 528. A processor 532 may be coupled to the PCB 530. The processor 532 may execute the methods described herein (e.g., methods 200, 250, 270, and 290).

As shown in FIGS. 2-3, first and second inlet ports 508a, b are coupled to the manometer housing 504 and are configured to couple to first and second connectors (e.g., tubes or hoses). Specifically, as depicted, the first and second inlet ports 508a, b are coupled to the second rear wall portion 505b. The first and second inlet ports 508a, b may include similar features as described with respect to the first and second inlet ports 116a, b of FIG. 1B. The first and second inlet ports 508a, b may be coupled to or in communication with the processor 532 (e.g., for analyzing pressure data received via the first and second inlet ports 508a, b).

The asbestos abatement device 500 may include a power input 515. The power input 515 may couple the asbestos abatement device 500 to a power source (e.g., to an electrical outlet). As shown, the power input 515 is positioned on the second rear wall portion 505b. The power input 515 may be coupled to the processor 532. The power input 515 may provide power to the asbestos abatement device 500 components. In some embodiments, the power input 515 provides power to the negative air machine outlet 510 and to the printer 518, described below. In some embodiments, the asbestos abatement device 500 includes a battery. In these embodiments, the power input 515 may be omitted or the battery may provide power in addition to the power input 515. In embodiments where the power input 515 provides power to the negative air machine outlet 510 and to the printer 518, the battery may provide power to the other asbestos abatement device 500 components. As shown, the top wall 506 may include a power status indicator 497 and/or a battery charge indicator 499. The power status indicator 497 may indicate whether the asbestos abatement device 500 is on or off. The battery charge indicator 499 may indicate the amount of charge left in the battery (e.g., by using different colors indicative of different charge levels) or that the battery is running on low power and needs to be charged (e.g., if the battery is a rechargeable battery) or replaced (e.g., if the battery is not rechargeable).

The asbestos abatement device 500 includes a negative air machine outlet 510 integrated into or coupled to the manometer housing 504 or top wall 506 and in communication with the processor 532. As shown, the negative air machine outlet 510 is a three prong outlet capable of outputting a maximum of 15 amps; however, other power capacity outlets are contemplated. The negative air machine outlet 510 may be coupled to a high voltage relay positioned inside the housing cavity 528. The high voltage relay may be coupled to the processor 532. The high voltage relay may be coupled to the power input 515 or power source. The high voltage relay may take power from the power input 515 or power source to activate the negative air machine outlet 510 based on instructions from the processor 532. As shown, the asbestos abatement device 500 also includes a USB port 512 integrated into or coupled to the manometer housing 504 or top wall 506 for receiving a USB device. The asbestos abatement device 500 may further include a power or ON/OFF switch 514 to turn the device ON or OFF.

As shown in FIGS. 2-3, the asbestos abatement device 500 may include a GUI 516 for programming the asbestos abatement device 500 and monitoring various parameters. For example, the GUI 516 may receive user input, such as, for example, an address, date, time, language preference, asbestos containment area size/measurements, and the like. The user input may be related to data requested by government authorities for asbestos regulation purposes. The GUI 516 may display data for monitoring purposes. For example, the data displayed may be related to data requirements imposed by government authorities for asbestos containment. For example, the GUI 516 may display pressure data (e.g., determined by the processing element) and date and time information.

The asbestos abatement device 500 may be positioned inside an external casing or housing 526. The external housing 526 may protect the asbestos abatement device 500 from damage. A top of the external housing 526 (not shown) may be positioned over top of the asbestos abatement device 500 to seal the asbestos abatement device 500 inside the external housing 526.

Figure 6:
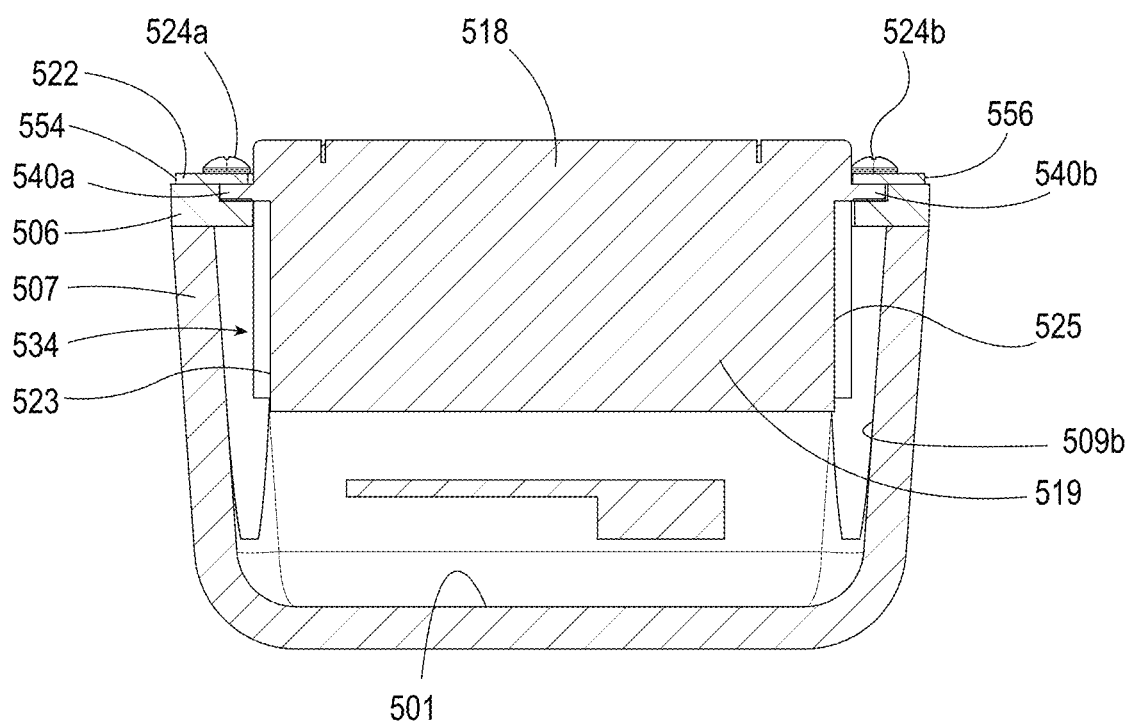
FIG. 6 is a cross section view of a printer in the printer cavity of the asbestos abatement device of FIG. 2 taken along line 6-6.
Figure 7A:
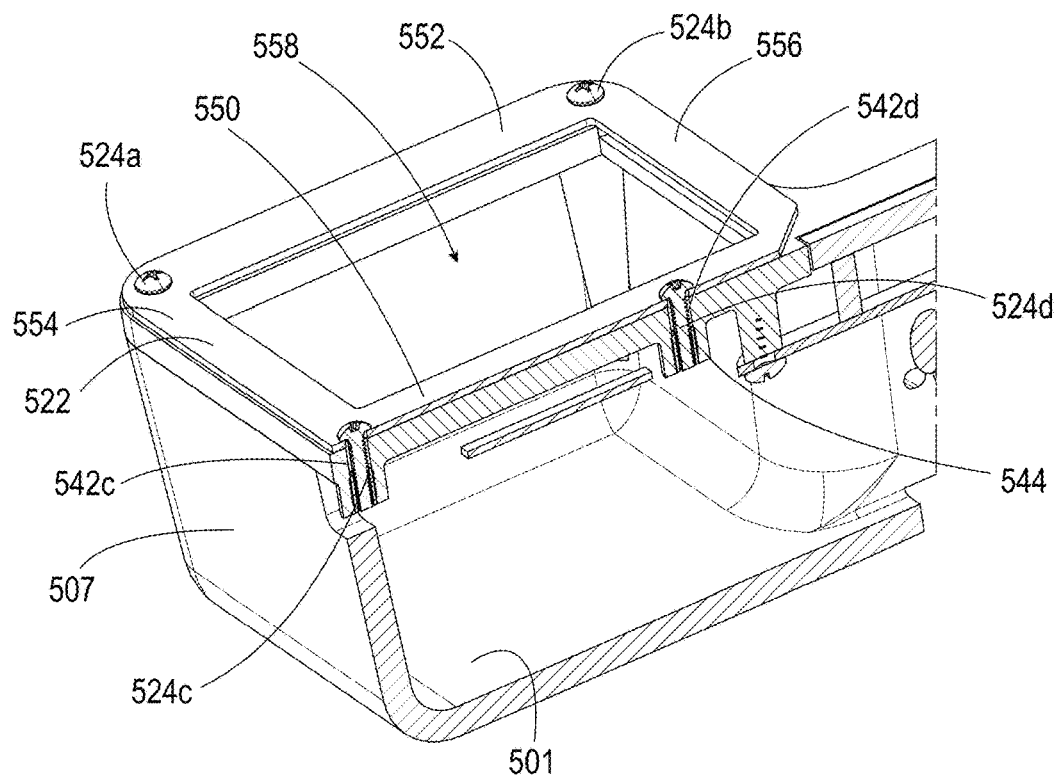
FIGS. 7A-C are cross section views of a printer mounting plate of the asbestos abatement device of FIG. 2 taken along lines 7A-7A, 7B-7B, and 7C-7C, respectively.
Figure 7B:
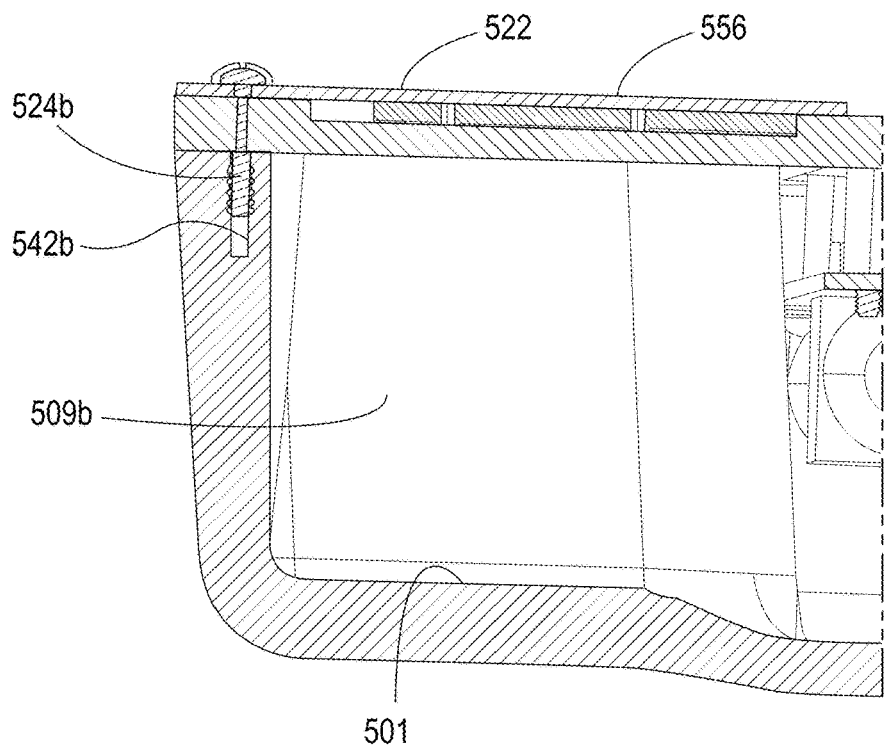
Figure 7C:
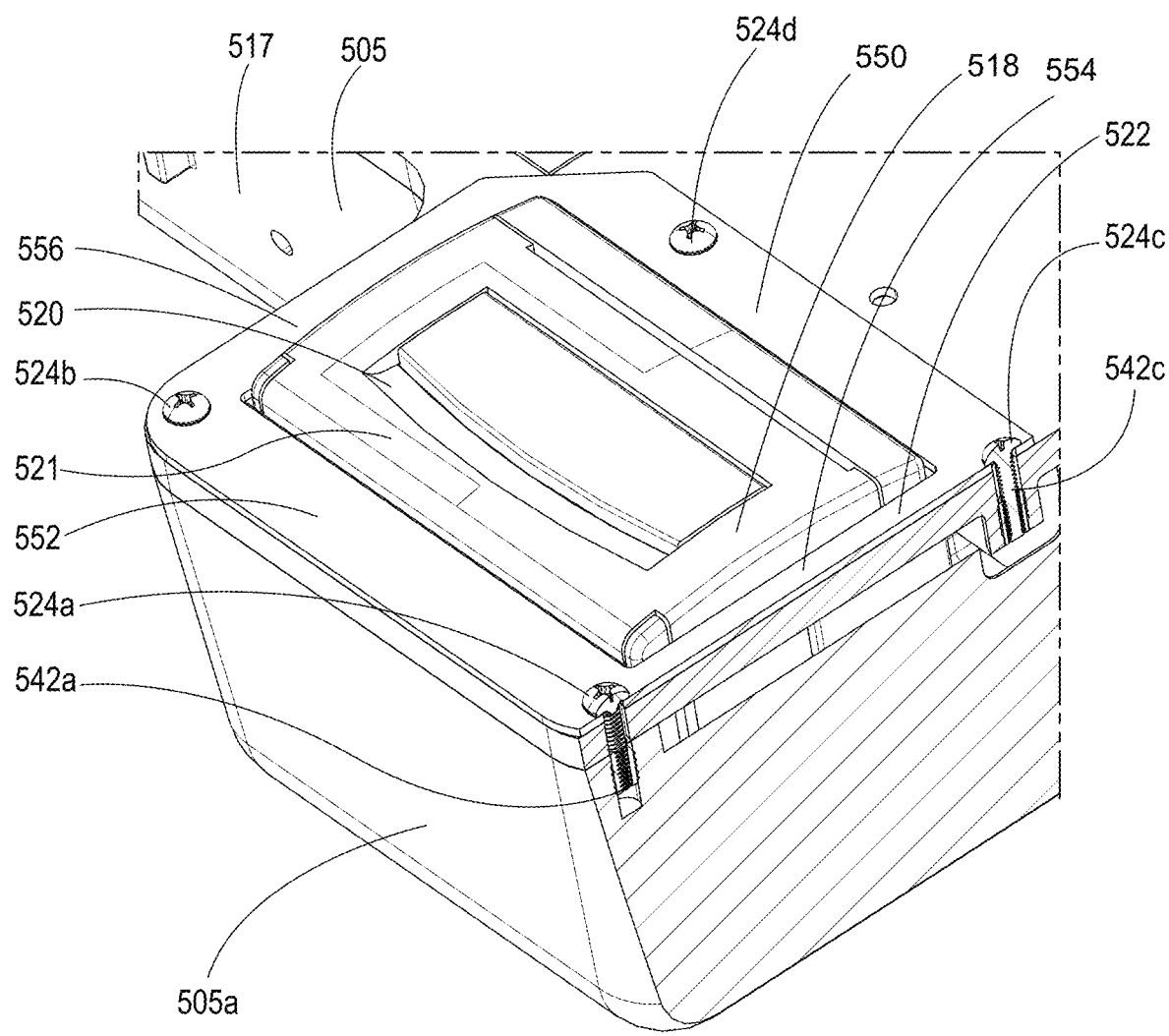

The asbestos abatement device 500 may include a removable printer 518. With reference to FIGS. 2-7C, the removable printer 518 will now be discussed in more detail. FIG. 5 is a cross section view of a printer cavity 534 of the asbestos abatement device 500 of FIG. 2 taken along line 5-5. FIG. 6 is a cross section view of the printer 518 in the printer cavity 534 of the asbestos abatement device 500 of FIG. 2 taken along line 6-6. FIGS. 7A-C are cross section views of a printer mounting plate of the asbestos abatement device 500 of FIG. 2 taken along lines 7A-7A, 7B-7B, and 7C-7C, respectively, showing how the printer mounting plate 522 is coupled to the asbestos abatement device 500. The printer 518 may include a printer body 519. The printer 518 may include a printer top surface 521 and a left printer side wall 523 and a right printer side wall 525. The printer top surface 521 may include a paper feed area 520. The printer 518 may include first and second flanges or tabs 540a, b on opposing sides of the printer body 519. As shown, the first and second flanges 540a, b extend out from the printer body 519, from the left printer side wall 523 and the right printer side wall 525, respectively. The printer 518 may be made of plastic or another durable material.

A printer cavity 534 may be formed by a portion of the manometer housing 504. For example, the printer cavity 534 may be defined by a portion of the left side wall 507, the first rear wall portion 505a, the second right side wall portion 509b, and a portion of the bottom wall 501. The top wall opening 511 may define a printer cavity opening 535.

The printer 518 may be positioned at least partially within the printer cavity 534 such that the first and second flanges 540a, b are positioned within the first and second top wall recesses 536a, b, respectively, of the top wall 506 and the first and second flanges 540a, b are flush with the top plate 506. The printer body 519 may be positioned inside the printer cavity 534 and the printer top surface 521 may extend slightly above the top wall 506.

A mounting plate 522 may be positioned over a portion of the printer 518 to couple the printer 518 to the manometer housing 504. The mounting plate 522 may be shaped to correspond with a shape of the manometer housing 504. The mounting plate 522 may have a semi-rectangular shape. The mounting plate 522 may have a front portion 550, a rear portion 552, a left side portion 554, and a right side portion 556. The mounting plate 522 may include a mounting plate opening 558 that is defined by the front portion 550, rear portion 552, left side portion 554, and right side portion 556. As shown, the mounting plate opening 558 is positioned between the left side portion 554 and the right side portion 556. As shown in FIG. 2, the left side portion 554 may align with a portion of the left side wall 507, the rear portion 522 may align with the first rear wall portion 505a, and the right side portion 556 may align with the right side wall portion 509b. The mounting plate opening 558 may align with the top wall opening 511. First and second grooves 538a, b may be formed by the first and second top wall recesses 536a, b in the top wall 506 and the mounting plate 522 when the mounting plate 522 is coupled to the asbestos abatement device 500. The mounting plate 522 may be made of metal (e.g., aluminum) or another durable material.

The mounting plate 522 may include a plurality of mounting plate apertures for receiving a plurality of fasteners 524a, b, c, d. The mounting plate apertures may align with first, second, third, and fourth fastener receptacles 542a, b, c, d of the asbestos abatement device 500. As shown in FIG. 7C, the first fastener receptacle 542a may be formed in a portion of the top wall 506 and the left side wall 507. As shown in FIG. 7B, the second fastener receptacle 542b may be formed in a portion of the top wall 506 and the first rear wall portion 505a. As shown in FIG. 7A, the third fastener receptacle 542c may be formed in a portion of the top wall 506 and the left side wall 507, and the fourth fastener receptacle 542d may be formed in a portion of the top wall 506 and a top wall extension 544 that extends from a bottom side of the top wall 506 into the housing cavity 528. The top wall extension 544 may be positioned so that the top wall extension 544 and the fourth fastener receptacle 542d (and a fastener positioned therein) does not interfere with the GUI 516. The first, second, third, and fourth fastener receptacles 542a, b, c, d may include threading to receive threaded fasteners. For example, the fastener receptacles 542a, b, c, d may be formed by machine threading and may include machine threaded surfaces. Different arrangements of the fastener receptacles 542a, b, c, d are contemplated. For example, the top wall extension 544 may be omitted and the fourth fastener receptacle 542d may be formed or defined in a portion of the manometer housing 504 (e.g., where the GUI 516 is in a different position).

The printer 518 may be removably coupled to the asbestos abatement device 500 by the mounting plate 522. As discussed, the printer 518 may be positioned within the printer cavity opening 535 such that the printer body 519 is positioned inside the printer cavity 534. The first and second flanges 540a, b may be positioned within the first and second top wall recesses 536a, b, respectively. The mounting plate 522 may be positioned above or on top of the top plate 506 such that the left side portion 554 is positioned at least partially over the first flange 540a and the right side portion 556 is positioned at least partially over the second flange 540b. When the mounting plate 522 is in position, the first flange 540a is positioned inside the first groove 538a and the second flange 540b is positioned inside the second groove 538b. The mounting plate 522 may be positioned such that the mounting plate apertures align with the first, second, third, and fourth fastener receptacles 542a, b, c, d.

The mounting plate 522 may be coupled to the manometer housing 504 (e.g., to the top plate 506) by a plurality of fasteners 524a, b, c, d. In the depicted example, the fasteners 524a, b, c, d are screws; however, other removable fasteners are contemplated, as discussed above. The fasteners 524a, b, c, d may be received by the mounting plate apertures and the respective first, second, third, and fourth fastener receptacles 542a, b, c, d. For example, the fasteners 524a, b, c, d may be screwed into the respective first, second, third, and fourth fastener receptacles 542a, b, c, d via threading on the fasteners 524a, b, c, d and threading inside the first, second, third, and fourth fastener receptacles 542a, b, c, d. The fasteners 524a, b, c, d may tighten the mounting plate 522 over the first and second flanges 540a, b, thereby holding the printer 518 securely in place.

Coupling the printer 518 to the asbestos abatement device 500 with a metal mounting plate 522 may have certain advantages. For example, the metal mounting plate 522 may provide a more durable coupling of the printer 518 to the asbestos abatement device 500. For example, if the printer 518 were directly fastened to the asbestos abatement device 500 (e.g., by coupling the fasteners 524a, b, c, d to the printer 518), the fastener apertures may be small and close to the printer body 519, providing limited tolerance when coupling the printer 518 to the manometer housing 504. Further, the mounting plate 522 may allow for the printer 518 to be removed from and reattached or recoupled to the asbestos abatement device 500 numerous times without damaging the fastening mechanisms. For example, if the printer 518 were directly fastened to the asbestos abatement device 500, e.g., via fastener apertures formed in the printer 518, the plastic printer material may strip over time as the printer 518 is removed and reattached.

The arrangement of the mounting plate 522, fasteners 524a, b, c, d, and printer 518 may be such as to allow the printer 518 to be easily removed from the asbestos abatement device 500, e.g., to facilitate repair or replacement of the printer 518. To remove the printer 518 from the asbestos abatement device 500, the fasteners 524a, b, c, d may be removed from the first, second, third, and fourth fastener receptacles 542a, b, c, d, respectively (e.g., by unscrewing the screws in the depicted example). The mounting plate 522 may be lifted from the manometer housing 504 and the printer 518 easily removed from the printer cavity 534.

The arrangement of the printer 518 and the negative air machine outlet 510 on the manometer housing 504 and relative to each other provides improved durability to the asbestos abatement device 500. The negative air machine outlet 510 may be positioned relative to other asbestos abatement device 500 components to space the high voltage relay coupled thereto from the other asbestos abatement device 500 components running off of a lower voltage.

Figure 8:
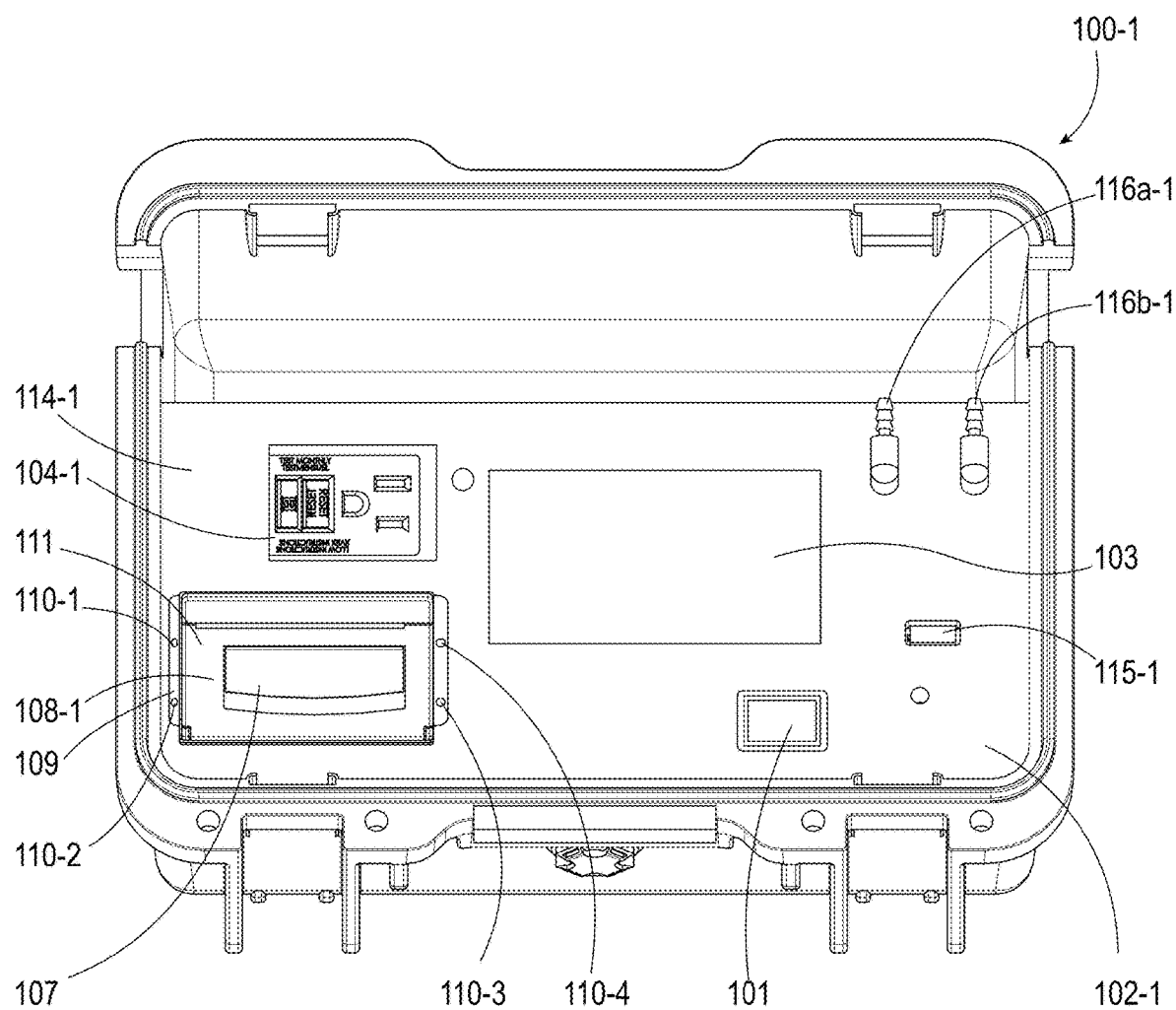
FIG. 8 is a top isometric view of another embodiment of an asbestos abatement device.

FIG. 8 is a top isometric view of another embodiments of an asbestos abatement device 100-1. The asbestos abatement device 100-1 includes the same or similar features as those described above with respect to the asbestos abatement device 100 of FIGS. 1A-B and the asbestos abatement device 500 described with respect to FIGS. 2-7C. For example, as shown, the asbestos abatement device 100-1 includes a manometer 102-1 with a manometer body or housing 114-1. First and second inlet ports 116a-1, 116b-1 are coupled to the manometer body 114-1 and configured to couple to first and second connectors (e.g., tubes or hoses). The asbestos abatement device 100-1 includes a negative air machine outlet 104-1 integrated into the manometer body 114-1 and in communication with a processing element. As shown, the asbestos abatement device 100-1 also includes a USB port 115-1 integrated into the manometer body 114-1 for receiving a USB device. The asbestos abatement device 100-1 further includes a power or ON/OFF switch 101 to turn the device ON or OFF.

As shown in FIG. 8, the asbestos abatement device 100-1 may include a graphical user interface (GUI) 103 for programming the asbestos abatement device 100-1 and monitoring various parameters. For example, the GUI 103 may receive user input, such as, for example, an address, date, time, asbestos containment area size/measurements, and the like. The user input may be related to data requested by government authorities for asbestos regulation purposes.

The GUI 103 may display data for monitoring purposes. For example, the data displayed may be related to data requirements imposed by government authorities for asbestos containment. For example, the GUI 103 may display pressure data (e.g., determined by the processing element) and date and time information.

With continued reference to FIG. 8, the asbestos abatement device 100-1 may include a removable printer 108-1 similar to that described above with respect to FIG. 1A. The printer 108-1 may include a paper feed area 107 and a mounting plate 109 on a top surface 111. The mounting plate 109 may include a plurality of apertures for receiving a plurality of fasteners 110-1, 110-2, 110-3, 110-4. As shown, the printer 108-1 may be coupled to the manometer body 114-1 by the plurality of fasteners 110-1, 110-2, 110-3, 110-4. In the depicted example, the fasteners 110-1-4 are screws that couple the printer 108-1 to the manometer body 114-1 and are removable to remove the printer 108-1 from the manometer 102-1. The printer body may be contained within the manometer body 114-1 and removable from the manometer 102-1.

Figure 9:
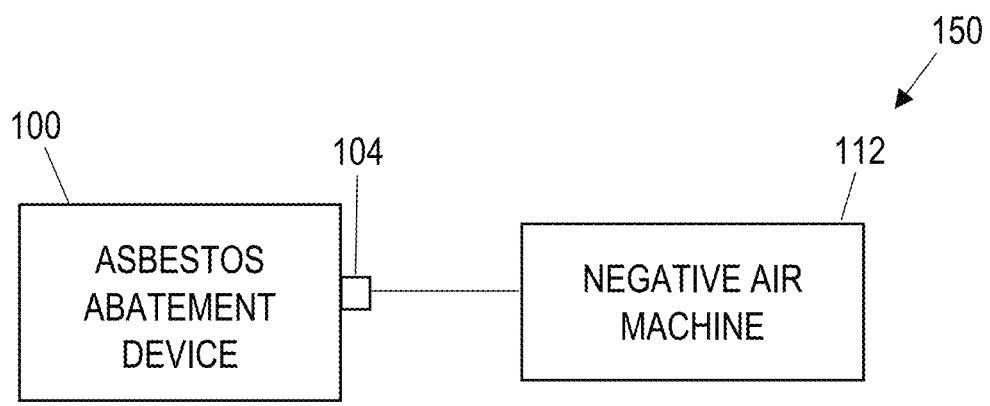
FIG. 9 is a simplified block diagram of an asbestos abatement system including the asbestos abatement device of FIG. 1A.

FIG. 9 is a simplified block diagram of an asbestos abatement system 150. The asbestos abatement system 150 may include an asbestos abatement device 100 (e.g., asbestos abatement device 100, 500, or 100-1, as described with respect to FIGS. 1A-8), and a negative air machine 112. The negative air machine 112 may be any type of fan (e.g., smart or dumb) that exhausts air out of an environment and creates negative pressure inside the environment. For example, the negative air machine 112 may be a squirrel cage fan or a radial fan. The negative air machine 112 may be configured to run continuously for long periods of time (e.g., several days or weeks). The negative air machine 112 may include filtration capabilities (e.g., a HEPA filter) to filter out asbestos particles prior to exhausting the air to the external environment. In embodiments where power is varied to the negative air machine 112, the negative air machine 112 may include a variable frequency drive (VFD), which is a type of motor controller that drives an electric motor by varying the frequency and voltage of its power supply. In some embodiments, the negative air machine 112 is a variable frequency drive fan. In embodiments where the negative air machine outlet 104 is a non-standard outlet (e.g., configured for variable power), the negative air machine 112 may include a non-standard plug configured to couple to the non-standard outlet and receive variable power.

As shown, the negative air machine 112 may be coupled to the asbestos abatement device 100 via the negative air machine outlet 104. The negative air machine outlet 104 may power and/or control the negative air machine 112. In this manner, in these embodiments, the negative air machine 112 may not require any specialized system or processor and/or external power source and the asbestos abatement system 150 can operate with any type of fan (e.g., a dumb fan), limiting the cost and complexity associated with regulating the asbestos containment environment. In some embodiments, the negative air machine outlet 104 may turn the negative air machine 112 ON or OFF based on a determined pressure differential, as discussed below with respect to FIG. 10. In some embodiments, the negative air machine outlet 104 controls the speed or setting of the negative air machine 112 based on a determined pressure differential and/or deviation from a threshold value, as discussed below with respect to FIG. 11.

Figure 10:
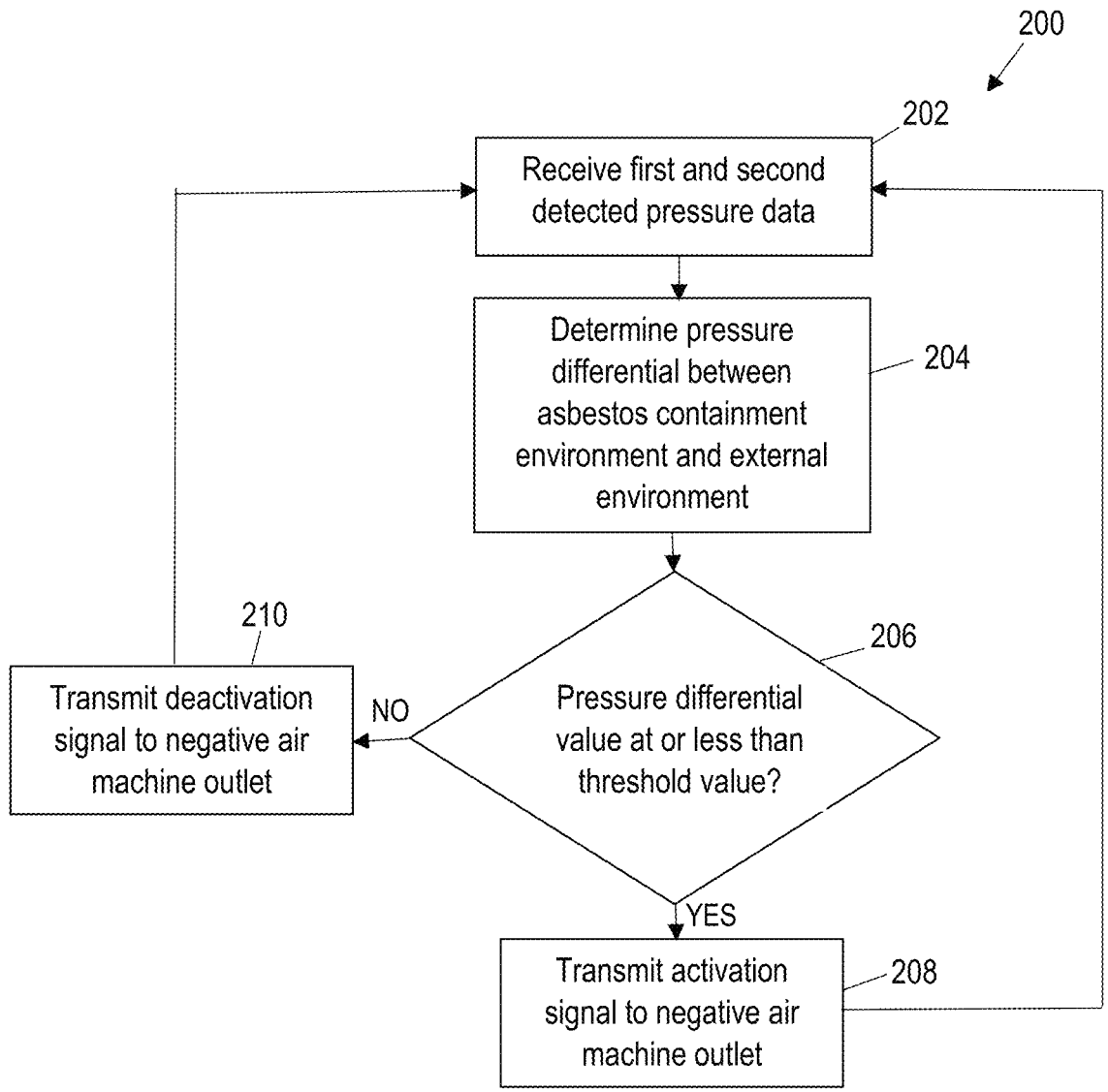
FIG. 10 is a flow chart illustrating a method of activating a negative air machine with a disclosed asbestos abatement device.

FIG. 10 is a flow chart illustrating a method 200 of activating a negative air machine with a disclosed asbestos abatement device (e.g., to regulate pressure within an asbestos containment environment). The method 200 begins with operation 202 and first and second detected pressure data is received. For example, the processing element 106 may receive first and second detected pressure data from the first and second inlet port 116a, b, respectively. In this example, the first detected pressure data from the first inlet port 116a is indicative of pressure in the asbestos containment environment 120 and the second detected pressure data from the second inlet port 116b is indicative of pressure in the external environment 122.

After operation 202, the method 200 may proceed to operation 204 and a pressure differential between the asbestos containment environment 120 and the external environment 122 is determined based on the received first and second detected pressure data. For example, the processing element 106 may determine the difference between the first and second detected pressure data by subtracting the second detected pressure data from the first detected pressure data. In this manner, a negative result is indicative of a negative pressure environment in the asbestos containment environment 120.

After operation 204, the method 200 may proceed to operation 206 and the processing element 106 determines whether the pressure differential value is at or less than a threshold value. As discussed above, the threshold value may be a preset or predetermined value that is indicative of a desirable negative pressure for the asbestos containment environment 120 (e.g., to avoid toxins leaking into the external environment 122), e.g., based on asbestos abatement regulations. As one example, if the asbestos abatement device 100 is used in Colorado, the threshold value may be −0.02 inches of WC based on current Colorado regulations; however, other values are contemplated, e.g., based on changes in regulations or variance in regulations for different states or countries. For example, the threshold value may be −0.03 inches of WC, −0.04 inches of WC, −0.05 inches of WC, −0.06 inches of WC, and the like.

In some embodiments, the threshold value may be a buffer value that is greater than the desired negative pressure differential (e.g., the regulated value) to prevent the pressure differential from reaching and/or dropping below the desired negative pressure differential or regulated value. In the Colorado example above, the threshold value may be set at greater than −0.02 inches of WC to act as a buffer to avoid the pressure differential reaching and/or dropping below −0.02 inches of WC. For example, the threshold value may be set at −0.021, −0.022, −0.023, −0.024, −0.025, or the like.

Figure 14:
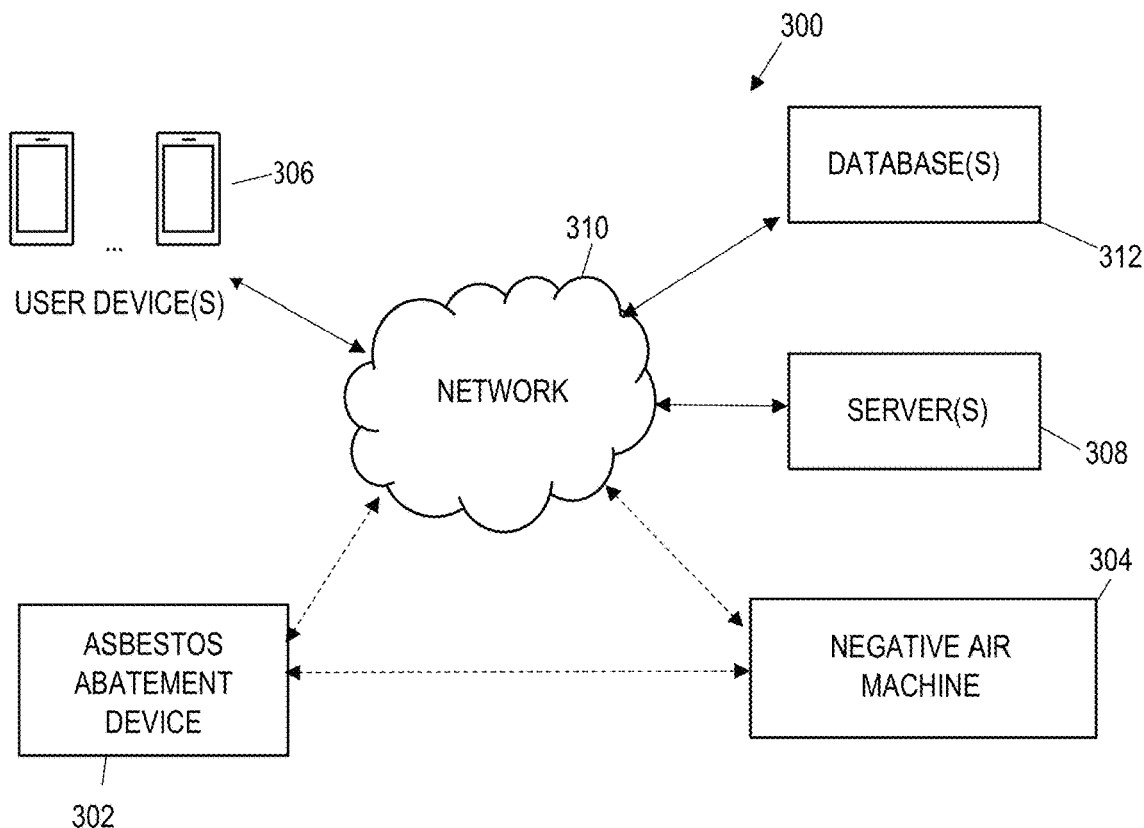
FIG. 14 is a block diagram illustrating an example of another embodiment of an asbestos abatement system.

The threshold value may be received by the processing element 106 through user input (e.g., via the GUI 516 of FIG. 2 or the GUI 103 of FIG. 8) and/or through data received from an external database (e.g., the one or more databases 312 described below with respect to FIG. 14 and in communication with the processing element 106 over a network 310) (e.g., a database storing asbestos containment regulation data). The threshold value may be determined by the processing element 106. For example, the processing element 106 may receive a regulated value or otherwise desired negative pressure differential value (e.g., via user input or a database) and generate a buffer value based on the received value. For example, the processing element 106 may determine the threshold value is a buffer value that is greater than and within a range of the regulated value, e.g., within −0.001, −0.002, −0.003, −0.004, −0.005, or the like of the regulated value. In the Colorado example, the processing element 106 may receive a regulated value of −0.02 inches of WC and generate a threshold value of −0.023 inches of WC to provide a buffer to avoid the pressure differential reaching and/or dropping below the regulated value.

In several embodiments, the processing element 106 may determine the pressure differential is less than the threshold value when it is less than the desired negative pressure differential (e.g., the regulated value) or less than the buffer value. In the Colorado example, the processing element 106 may determine the pressure differential value is less than the threshold value when the pressure differential value is less than −0.02 inches of WC (e.g., −0.01 inches of WC) or less than a buffer value of −0.023 inches of WC (e.g., −0.022 inches of WC).

In several embodiments, the processing element 106 may determine the pressure differential is greater than the threshold value when it is greater than the desired negative pressure differential or regulated value or greater than the buffer value. In the Colorado example, the processing element 106 may determine the pressure differential value is greater than the threshold value when the pressure differential is greater than −0.02 inches of WC (e.g., −0.03 inches of WC) or greater than a buffer value of −0.023 inches of WC (e.g., −0.025 inches of WC).

In some embodiments, the processing element 106 determines whether the pressure differential value is within a value range of the threshold value. For example, in embodiments where the threshold value is a regulated value, the processing element 106 may determine when the pressure differential is within a value range of the regulated value to generate a buffer to avoid the pressure differential reaching and/or dropping below the regulated value. In the Colorado example, the processing element 106 may determine the pressure differential is within −0.001, −0.002, −0.003, −0.004, −0.005, or the like of the regulated value of −0.02 inches of WC (e.g., at −0.021 inches of WC, −0.022 inches of WC, −0.023 inches of WC, −0.024 inches of WC, −0.025 inches of WC, or the like).

If it is determined at operation 206 that the pressure differential value is at or less than the threshold value (or in some embodiments, within a value range of the threshold value), the method 200 may proceed to operation 208 and an activation signal is transmitted to a negative air machine outlet. For example, the processing element 106 may transmit an ON signal to the negative air machine outlet 104 (e.g., via a circuit). When the negative air machine outlet 104 is coupled to a negative air machine 112 (e.g., FIG. 9), activation of the negative air machine outlet 104 activates the negative air machine 112 to exhaust air from the asbestos containment environment 120, thereby reducing the pressure in the asbestos containment environment 120 (e.g., to regulate/maintain the asbestos containment environment 120).

If it is determined at operation 206 that the pressure differential value is not at or less than the threshold value, and is instead greater than the threshold value, the method 200 may proceed to operation 210 and a deactivation signal is transmitted to the negative air machine outlet. For example, the processing element 106 may transmit an OFF signal to the negative air machine outlet 104 (e.g., via a circuit). When the negative air machine outlet 104 is coupled to a negative air machine 112 (e.g., FIG. 9), deactivation of the negative air machine outlet 104 deactivates or turns off the negative air machine 112 to stop exhausting air from the asbestos containment environment 120, thereby maintaining the pressure in the asbestos containment environment 120 above the threshold value.

After operation 208 or operation 210, the method 200 may proceed to operation 202 and the first and second detected pressure data may be received. Pressure data may be constantly received or received at particular intervals of time (e.g., as determined by asbestos abatement regulations) to consistently monitor the asbestos containment environment 120 to ensure containment is maintained and toxins do not leak into the external environment 122.

Figure 11:
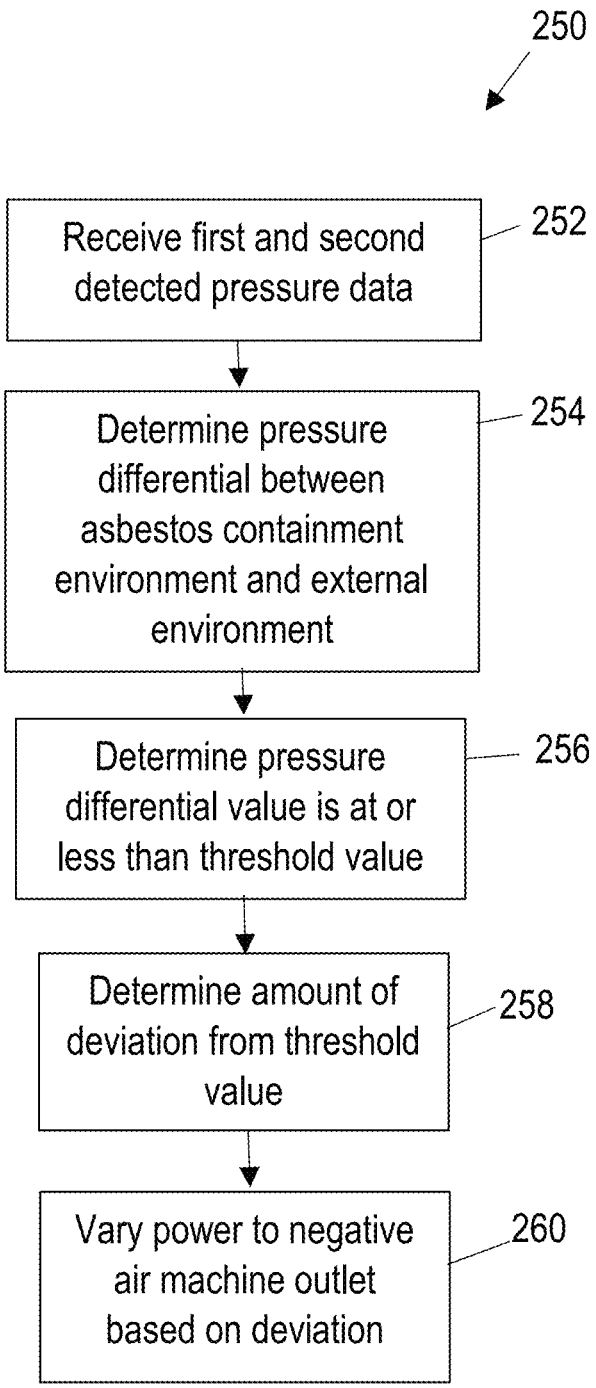
FIG. 11 is a flow chart illustrating a method of varying power to a negative air machine with a disclosed asbestos abatement device.

FIG. 11 is a flow chart illustrating a method 250 of varying power of a negative air machine with a disclosed asbestos abatement device (e.g., to regulate pressure within an asbestos containment environment). The method 250 begins with operation 252 and first and second detected pressure data is received in a similar manner as described above with respect to operation 202 of method 200. After operation 252, the method 250 may proceed to operation 254 and a pressure differential between the asbestos containment environment 120 and the external environment 122 is determined based on the received first and second detected pressure data in a similar manner as described above with respect to operation 204 of method 200. After operation 254, the method 250 may proceed to operation 256 and the processing element 106 determines the pressure differential value is at or less than a threshold value in a similar manner as discussed above with respect to operation 206 of method 200. In the Colorado example, the processing element 106 may determine the pressure differential value is at or less than −0.02 inches of WC or a buffer value of −0.022 inches of WC.

After operation 256, the method 250 may proceed to operation 258 and an amount of deviation of the pressure differential value from the threshold value is determined. As an example, a pressure differential value of −0.01 inches of WC deviates from a −0.02 inches of WC threshold value by −0.01 inches of WC.

After operation 258, the method 250 may proceed to operation 260 and the power frequency and/or voltage to the negative air machine outlet is varied based on the amount of deviation. For example, a certain variance in power frequency may be associated with a particular amount of deviation. A particular power frequency may be associated with a certain speed of a negative air machine. The speed of the negative air machine may impact the time it takes to return the pressure differential above the threshold value, depending on the amount of deviation from the threshold value. For example, the faster the negative air machine exhausts air out of the asbestos containment environment 120, the less time it may take to return the pressure differential above the threshold value. It may be desirable to return the pressure differential above the threshold value within a short timeframe to avoid any leakage outside the asbestos containment environment 120. A greater deviation may require a greater power to increase the output of the negative air machine to achieve the desired pressure differential in a short amount of time. Based on the amount of deviation from the threshold value and a desired timeframe to return the pressure differential above the threshold value, the power frequency to the negative air machine outlet may be varied to vary the speed of a negative air machine that is coupled thereto. The variation of the power frequency and/or voltage and negative air machine speed based on the amount of deviation may also be dependent upon the size of the containment area. For example, a larger containment area may require a greater increase in the speed of the negative air machine for the same amount of deviation as occurs in a smaller containment area. The following exemplary equations may be implemented by the processing element to determine how to vary the power and negative air machine speed based on the amount of deviation from the threshold value:

$$\text{Airflow Volume Needed (cubic feet per minute)} = (\text{Volume of Containment Area}) \times (\% \text{ Differential}) \times 4$$

$$\% \text{ of Power Needed} = (\text{Rated } CFM \times .6)$$

As discussed above, the processing element 106 may determine a buffer value range that is greater than the threshold value for activating the negative air machine before the negative pressure differential value reaches the threshold value. In some embodiments, the processing element 106 may adjust the power voltage and/or frequency output by the negative air machine output 104 to adjust the negative air machine speed when the negative pressure differential is within the buffer value range and approaching the threshold value. For example, the processing element 106 may adjust the negative air machine speed based on the amount of deviation from the threshold value, for example, decreasing voltage and speed as the negative pressure differential increases and deviates further from the threshold value (and eventually turning the negative air machine off when it is outside the buffer value range).

Figure 12:
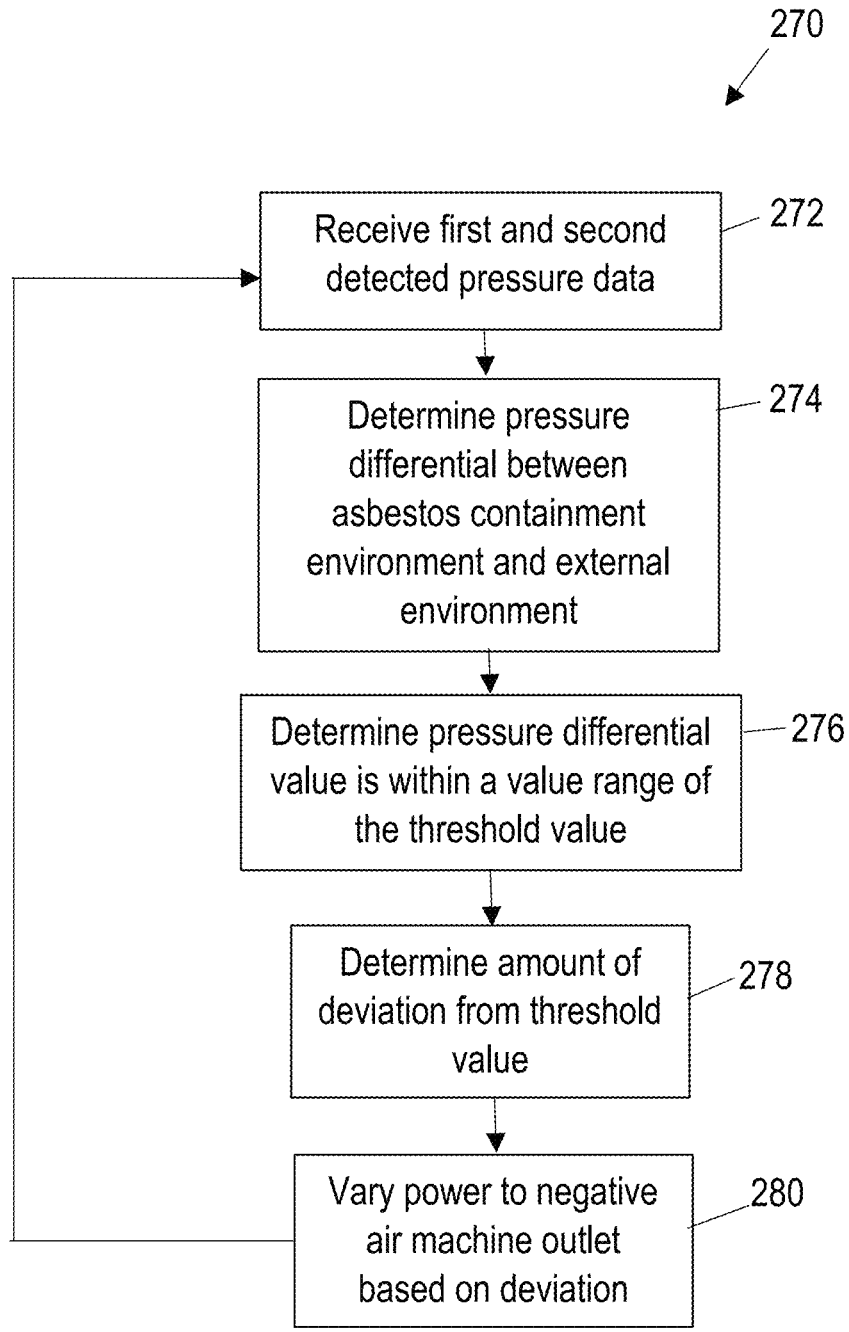
FIG. 12 is a flow chart illustrating a method of varying negative air machine speed as the negative pressure differential approaches the threshold value.

FIG. 12 is a flow chart illustrating a method of varying negative air machine speed as the negative pressure differential approaches the threshold value. The method 270 begins with operation 272 and first and second detected pressure data is received in a similar manner as described above with respect to operation 202 of method 200 and operation 252 of method 250. After operation 272, the method 270 may proceed to operation 274 and a pressure differential between the asbestos containment environment 120 and the external environment 122 is determined based on the received first and second detected pressure data in a similar manner as described above with respect to operation 204 of method 200 and operation 254 of method 250. After operation 274, the method 270 may proceed to operation 276 and the processing element 106 determines the pressure differential value is within a value range of a threshold value. For example, the processing element 106 may determine the pressure differential value is within a buffer value range. As an example, in the Colorado example, the processing element 106 may determine the pressure differential value of −0.022 is within the value range of −0.004 from the threshold value of −0.02 inches of WC.

After operation 276, the method 270 may proceed to operation 278 and an amount of deviation of the pressure differential value from the threshold value is determined. In the above example, a pressure differential value of −0.022 inches of WC deviates from the threshold value of −0.02 inches of WC threshold value by −0.002 inches of WC.

After operation 278, the method 270 may proceed to operation 280 and the power frequency and/or voltage to the negative air machine outlet is varied based on the amount of deviation. For example, a certain variance in power frequency and/or voltage may be associated with a particular amount of deviation. A particular power frequency and/or voltage may be associated with a certain speed of a negative air machine. The speed of the negative air machine may be increased the closer the measured negative pressure differential gets to the threshold value or the less the amount of deviation from the threshold value. In the above example where the buffer value range is within −0.004 of the threshold value of −0.02 inches of WC, the negative air machine may be off when the negative pressure differential value is at −0.025 inches of WC and may be turned on by the processing element to 20% power when the negative pressure differential value is at −0.024 inches of WC. The amount of power provided to the negative air machine may be increased as the amount of deviation from the threshold value decreases. For example, the processing element may turn the negative air machine on at 40% power when the negative pressure differential is at −0.023 inches of WC, 60% power when the negative pressure differential is at −0.022 inches of WC, 80% power when the negative pressure differential is at −0.021, and the like, up to 100% power when the pressure differential is at or below the threshold value of −0.02 inches of WC. The method 270 may return to operation 272 and repeat to consistently monitor the pressure differential and adjust the negative air machine power and speed based on the deviation from the threshold value. For example, in the above example, if the processing element determined the negative air pressure differential was −0.021 inches of WC on an initial reading and set the negative air machine at 80% power, and on the next reading determined the negative air pressure differential was at −0.023 inches of WC, the processing element may adjust the fan speed in half to 40% power.

Figure 13:
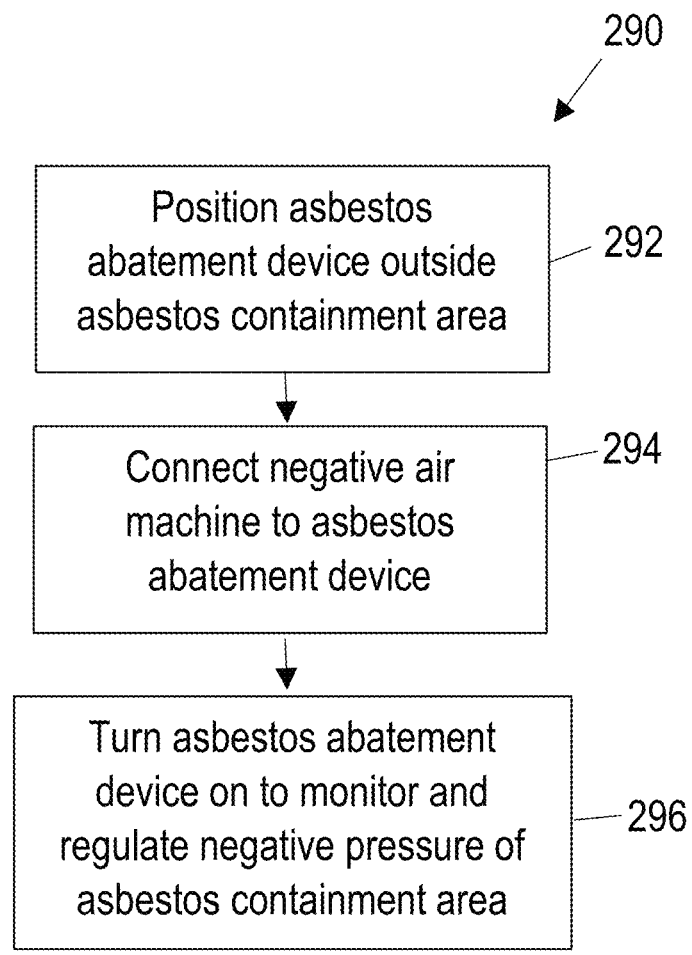
FIG. 13 is a flow chart illustrating a method of monitoring an asbestos containment area to comply with negative pressure requirements.

FIG. 13 is a flow chart illustrating a method of monitoring an asbestos containment area to comply with negative pressure requirements. The method 290 begins with operation 292 and an asbestos abatement device is positioned outside an asbestos containment area. The asbestos abatement device may be any of the asbestos abatement devices 100, 100-1, 302, 500 described herein and includes a manometer with an integrated negative air machine outlet. As discussed in more detail above with respect to FIG. 1B, first and second inlet ports of the manometer (e.g., ports 116a, b) may be connected to the asbestos containment area and the outside area, respectively, via first and second connectors (e.g., connectors 118a, b).

After operation 292, the method 290 may proceed to operation 294, and a negative air machine is coupled to the asbestos abatement device. For example, the negative air machine may be coupled to the asbestos abatement device via the negative air machine outlet, as discussed above with respect to FIG. 9.

After operation 294, the method 290 may proceed to operation 296, and the asbestos abatement device is turned on or activated to monitor and regulate negative pressure in the asbestos containment area. As discussed in more detail above, the asbestos abatement device monitors a negative pressure differential between the asbestos containment area and the outside area and activates and/or controls the negative air machine when the negative pressure differential is at or less than a threshold negative pressure differential value (e.g., a desired or regulated value).

While the above embodiments are described with respect to an outlet that is integrated with a manometer body 114, it is contemplated that the manometer 102 may communicate with a negative air machine via wireless means (e.g., via Wi-Fi, Bluetooth, etc.). In these embodiments, the negative air machine may be equipped with similar communication protocol (e.g., Wi-Fi, Bluetooth, etc.). FIG. 14 is block diagram illustrating an example of another embodiment of an asbestos abatement system 300. The system 300 includes an asbestos abatement device 302 in communication with a negative air machine 304. In some embodiments, the asbestos abatement device 302 is in communication with one or more user devices 306, which in turn are in communication with one or more servers or remote processing element(s) 308, via a network 310. In some embodiments, the asbestos abatement device 302 and negative air machine 304 are in communication with one or more servers 308, via network 310, which in turn may be in communication with one or more user devices 306. The one or more servers 308 may be in communication with one or more databases 312, via network 310. Each of the various components of the asbestos abatement system 300 may be in communication directly or indirectly with one another, such as through the network 310. In this manner, each of the components can transmit and receive data from other components in the system 300. In many instances, the one or more servers 308 may act as a go between for some of the components in the system 300.

The network 310 may be substantially any type or combination of types of communication systems for transmitting data either through wired or wireless mechanism (e.g., Wi-Fi, Ethernet, Bluetooth, cellular data, radio, or the like). In some embodiments, certain components of the asbestos abatement system 300 communicate via a first mode (e.g., Bluetooth) and others communicate via a second mode (e.g., Wi-Fi). Additionally, certain components may have multiple transmission mechanisms and be configured to communicate data in two or more manners. The configuration of the network 310 and communication mechanisms for each of the components may be varied as desired and based on the needs of a particular location.

The asbestos abatement device 302 may include connectivity and processing capabilities to receive, transmit, and process pressure and power/electrical data. Pressure data may include detected pressure data (e.g., received from first and second inlet ports and similar to the detected pressure data discussed above with respect to FIGS. 1A-13), pressure differential data (e.g., between two environments), pressure deviation data (e.g., deviation from a threshold value), and the like. Power/electrical data may include power frequency and/or voltage data (e.g., power frequency and/or voltage variation data), power activation or deactivation signals, and the like.

The negative air machine 304 may include connectivity and processing capabilities to receive, transmit, and process power/electrical data. For example, the negative air machine 304 may receive power activation or deactivation signals from the asbestos abatement device 302 (e.g., via a processor and communication protocol) to turn the negative air machine 304 on or off, respectively. As another example, the negative air machine 304 may receive power frequency and/or voltage variation data or signals instructing the negative air machine 304 to operate at a particular setting or speed.

The asbestos abatement device 302 may be in communication with one or more user devices 306. For example, the asbestos abatement device 302 may transmit one or more alerts, notifications, recordings (e.g., pressure recordings), or feedback to the one or more user devices 306. For example, the asbestos abatement device 302 may transmit an alert when the pressure differential is at or less than a threshold value (e.g., at or less than −0.02 inches of WC). The one or more user devices 306 may include various types of computing devices, e.g., smart phones, smart displays, tablet computers, desktop computers, laptop computers, set top boxes, gaming devices, wearable devices, or the like. The one or more user devices 306 provide output to and receive input from a user. The type and number of user devices 306 may vary as desired.

The one or more servers, central processing unit(s), or remote processing element(s) 308 are one or more computing devices that process and execute information. The one or more servers 308 may include their own processing elements, memory components, and the like, and/or may be in communication with one or more external components (e.g., separate memory storage)(an example of computing elements that may be included in the one or more servers 308 is disclosed below with respect to FIG. 15). The one or more servers 308 may include one or more server computers that are interconnected together via the network 310 or separate communication protocol. The one or more servers 308 may host and execute a number of the processes executed by the system 300, e.g., methods 200, 250, 270, and 290 of FIGS. 10-13, respectively.

The one or more databases 312 are configured to store information related to the systems and methods described herein. The one or more databases 312 may include one or more internal databases storing data collected or determined by the system, such as, for example, pressure data (e.g., detected pressure data, determined pressure differential data, determined pressure differential deviation data, etc.), electrical data (e.g., power frequency data, voltage data, power frequency and/or voltage variation data, etc.), time data (e.g., date and time of pressure readings), and the like. The one or more databases 312 may include one or more external databases storing data related to asbestos containment regulation, e.g., negative pressure differential values (or regulated values) determined by government agencies.

Figure 15:
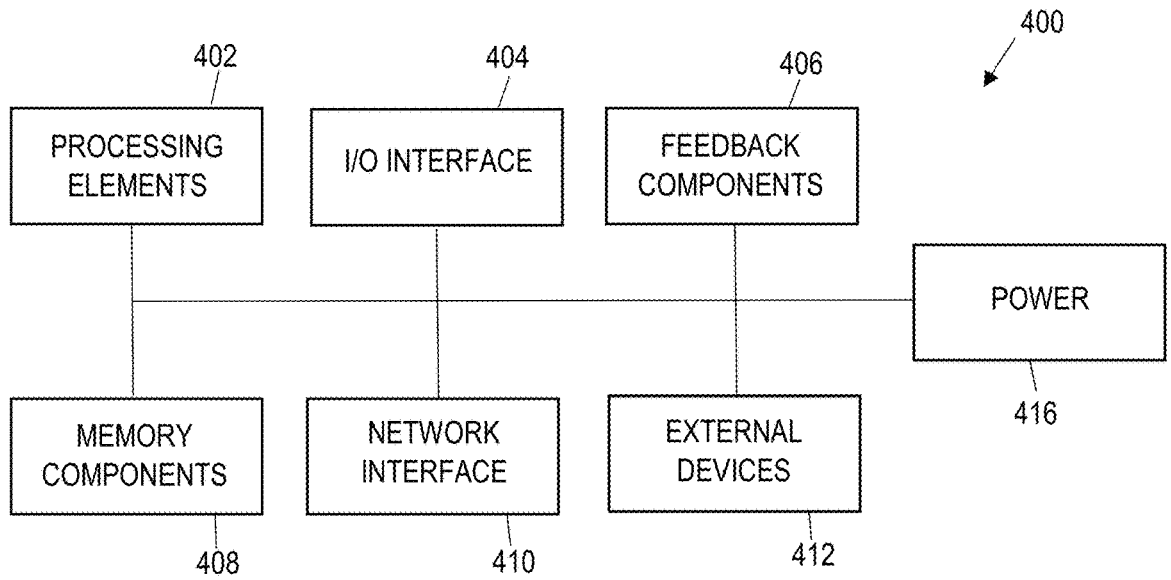
FIG. 15 is a simplified block diagram of a computing device that can be used by one or more components of the asbestos abatement devices and systems described herein.

A simplified block structure for computing devices that may be used with disclosed asbestos abatement devices 100, 100-1, 302, 500 or integrated into one or more of disclosed asbestos abatement system 150, 300 components is shown in FIG. 15. For example, the asbestos abatement device 100, 100-1, 302, 500, negative air machine 112, 304, user device(s) 306, and/or server(s) 308 may include one or more of the components shown in FIG. 15 and be used to execute one or more of the operations disclosed in methods 200, 250, 270, and 290. With reference to FIG. 15, the computing device 400 may include one or more processing elements 402, an input/output interface 404, feedback components 406, one or more memory components 408, a network interface 410, one or more external devices 412, and a power source 416. Each of the various components may be in communication with one another through one or more busses, wireless means, or the like.

The local processing element 402 is any type of electronic device capable of processing, receiving, and/or transmitting instructions. For example, the local processing element 402 may be a central processing unit, microprocessor, processor, or microcontroller. The local processing element 402 may be the processing element 106 described above with respect to FIG. 1A or the processor 532 described above with respect to FIG. 4. Additionally, it should be noted that select components of the computing device 400 may be controlled by a first processor and other components may be controlled by a second processor, where the first and second processors may or may not be in communication with each other.

The one or more memory components 408 are used by the computing device 400 to store instructions for the local processing element 402, as well as store data, such as the pressure data (e.g., detected pressure data, determined pressure differential data, determined pressure differential deviation data, etc.), electrical data (e.g., power frequency, voltage, current data, variations in power frequency, voltage, current, etc.), time data (e.g., timing of pressure readings), and the like. The one or more memory components 408 may be, for example, magneto-optical storage, read-only memory, random access memory, erasable programmable memory, flash memory, or a combination of one or more types of memory components.

The one or more feedback components 406 provide visual, haptic, and/or auditory feedback to a user. For example, the one or more feedback components may include a display (e.g., the GUI 516 of FIG. 2 or the GUI 103 of FIG. 8) that provides visual feedback to a user and, optionally, can act as an input element to enable a user to control, manipulate, and calibrate various components of the computing device 400. The display may be a liquid crystal display, plasma display, organic light-emitting diode display, and/or cathode ray tube display. In embodiments where the display is used as an input, the display may include one or more touch or input sensors, such as capacitive touch sensors, resistive grid, or the like. As another example, the one or more feedback components 406 may include a light (e.g., LED), an alarm or alert sound, a vibration, and the like.

The I/O interface 404 allows a user to enter data into the computing device 400, as well as provides an input/output for the computing device 400 to communicate with other devices (e.g., the asbestos abatement device 100, 101-1, 302, 500, the negative air machine 112, 304, one or more servers 308, other computers, etc.). The I/O interface 404 can include one or more input buttons, touch pads, and so on.

The network interface 410 provides communication to and from the computing device 400 to other devices. For example, the network interface 410 allows the one or more servers 308 to communicate with the one or more user devices 306 through the network 310. The network interface 410 includes one or more communication protocols, such as, but not limited to Wi-Fi, Ethernet, Bluetooth, and so on. The network interface 410 may also include one or more hardwired components, such as a Universal Serial Bus (USB) cable, or the like. The configuration of the network interface 410 depends on the types of communication desired and may be modified to communicate via Wi-Fi, Bluetooth, and so on.

The external devices 412 are one or more devices that can be used to provide various inputs to the computing device 400, e.g., mouse, microphone, keyboard, trackpad, or the like. The external devices 412 may be local or remote and may vary as desired.

The power source 416 is used to provide power to the computing device 400, e.g., battery, electrical outlet, solar panel, or the like. In some embodiments, the power source 416 is rechargeable; for example, contact and contactless recharge capabilities are contemplated. In some embodiments, the power source 416 is a constant power management feed. In other embodiments, the power source 416 is intermittent (e.g., controlled by a power switch or activated by an external signal). The power source 416 may include an auxiliary power source.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated and may include wired or wireless connections, including electrical connections. As such, connection references do not necessarily infer that two elements are directly connected and in fixed relation to each other. The exemplary drawings are for purposes of illustration only and the dimensions, positions, order, and relative sizes reflected in the drawings attached hereto may vary.

While certain orders of operations are provided for methods disclosed herein, it is contemplated that the operations may be performed in any order and that operations can be omitted, unless specified otherwise.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

We claim:

1. An asbestos abatement device, comprising:
a housing defining a housing cavity;
first and second inlet ports coupled to the housing, the first inlet port is configured to measure a first pressure of an asbestos containment environment and the second inlet port is configured to measure a second pressure of an external environment;
a negative air machine outlet coupled to the housing; and
a processor coupled to a circuit board positioned inside the housing cavity, wherein the processor is in communication with the first and second inlet ports and the negative air machine outlet, and wherein the processor is configured to:
receive first pressure data from the first inlet port and second pressure data from the second inlet port;
determine a pressure differential between the asbestos containment environment and the external environment based on the received first pressure data and second pressure data;
determine whether the pressure differential is at or less than a threshold value; and
transmit a signal to the negative air machine outlet, wherein the signal is an ON signal that turns the negative air machine outlet on when the pressure differential is at or less than the threshold value.

2. The asbestos abatement device of claim 1, wherein the signal is an OFF signal that turns the negative air machine outlet off when the pressure differential is greater than the threshold value.

3. The asbestos abatement device of claim 1, wherein the processing element is further configured to determine an amount of deviation from the threshold value when the pressure differential is less than the threshold value, and the signal further varies a frequency of power flowing through the negative air machine outlet based on the amount of deviation.

4. The asbestos abatement device of claim 1, further comprising a removable printer coupled to the housing.

5. The asbestos abatement device of claim 4, further comprising a mounting plate coupled to the housing, the mounting plate comprising a left side portion and a right side portion, the left side portion and the right side portion defining a mounting plate opening therebetween;
   wherein the removable printer comprises:
      a printer body, and
      first and second flanges on opposing sides of the printer body;
   wherein the housing comprises a top wall, the top wall comprising a top wall opening, and first and second top wall recesses on opposing edges of the top wall opening;
   wherein the first and second flanges are positioned within the first and second top wall recesses, respectively, and the printer body is positioned inside the top wall opening; and
   wherein the left side portion and the right side portion are positioned at least partially on top of the first and second flanges, respectively, and the printer body is positioned inside the mounting plate opening.

6. The asbestos abatement device of claim 5, wherein the first and second flanges are flush with the top wall.

7. The asbestos abatement device of claim 1, further comprising a USB port coupled to the housing.

8. The asbestos abatement device of claim 1, further comprising a graphical user interface coupled to the housing, the graphical user interface configured to display information related to the first pressure data and the second pressure data.

9. An asbestos abatement system, comprising:
   a manometer, comprising:
      a manometer body,
      a first inlet port and a second inlet port coupled to the manometer body, the first inlet port configured to measure a first pressure of an asbestos containment environment, and the second inlet port configured to measure a second pressure of an external environment,
      a negative air machine outlet coupled to the manometer body, and
      a processing element in communication with the first inlet port, the second inlet port, and the negative air machine outlet, the processing element configured to:
         receive first pressure data from the first inlet port and second pressure data from the second inlet port,
         determine a pressure differential between the asbestos containment environment and the external environment based on the received first and second pressure data,
         determine whether the pressure differential is at or less than a threshold value, and
         transmit a signal to the negative air machine outlet; and
   a negative air machine coupled to the negative air machine outlet, wherein an operation state of the negative air machine is determined by the signal;
   wherein the signal is an ON signal that turns the negative air machine outlet on when the pressure differential is at or less than the threshold value, and the operation state of the negative air machine is an activated state.

10. The asbestos abatement system of claim 9, wherein the signal is an OFF signal that turns the negative air machine outlet off when the pressure differential is greater than the threshold value, and the operation state of the negative air machine is a deactivated state.

11. The asbestos abatement system of claim 9, wherein:
   the processing element is further configured to determine an amount of deviation from the threshold value when the pressure differential is less than the threshold value,
   the signal further varies power frequency flowing through the negative air machine outlet based on the amount of deviation, and
   the operation state of the negative air machine is further a certain speed of operation based on the varied power frequency.

12. The asbestos abatement system of claim 9, wherein the negative air machine outlet transmits voltage to the negative air machine when the signal is an ON signal.

13. The asbestos abatement system of claim 9, wherein:
   the manometer body comprises a top wall defining a top wall opening,
   a portion of the manometer body defines a printer cavity, and
   the top wall opening defines a printer cavity opening.

14. The asbestos abatement system of claim 13, further comprising:
   a removable printer positioned at least partially inside the printer cavity; and
   a mounting plate removably coupled to the top wall;
   wherein a portion of the mounting plate is positioned on top of a portion of the removable printer to removably couple the removable printer to the manometer body.

15. The asbestos abatement system of claim 9, wherein the negative air machine is a dumb fan.

16. The asbestos abatement device of claim 1, wherein the negative air machine outlet is an electrical outlet port.

17. The asbestos abatement device of claim 1, wherein the negative air machine outlet is configured to couple to and to activate any type of fan that exhausts air out of an environment.

18. The asbestos abatement device of claim 4, further comprising a mounting plate positioned at least partially on top of the removable printer, wherein the mounting plate is removably coupled to the housing and removably couples the printer to the housing.

19. An asbestos abatement device, comprising:
   a housing defining a housing cavity;
   first and second inlet ports coupled to the housing, the first inlet port is configured to measure a first pressure of an asbestos containment environment and the second inlet port is configured to measure a second pressure of an external environment;
   a negative air machine outlet coupled to the housing; and
   a processor coupled to a circuit board positioned inside the housing cavity, wherein the processor is in communication with the first and second inlet ports and the negative air machine outlet, and wherein the processor is configured to:
      receive first pressure data from the first inlet port and second pressure data from the second inlet port;
      determine a pressure differential between the asbestos containment environment and the external environment based on the received first pressure data and second pressure data;

determine whether the pressure differential is at or less than a threshold value;

determine an amount of deviation from the threshold value when the pressure differential is less than the threshold value; and transmit a signal to the negative air machine outlet, wherein the signal varies a frequency of power flowing through the negative air machine outlet based on the amount of deviation when the pressure differential is less than the threshold value.

20. The asbestos abatement device of claim 19, wherein a portion of the housing defines a printer cavity, and the asbestos abatement device further comprising a removable printer positioned inside the printer cavity, wherein the removable printer is removably coupled to the housing by a mounting plate positioned at least partially on top of the removable printer, wherein a plurality of fasteners removably couple the mounting plate to the housing.

\* \* \* \* \*